United States Patent
Sánchez De La Fuente et al.

(10) Patent No.: US 12,323,643 B2
(45) Date of Patent: Jun. 3, 2025

(54) FILE PARSER, FILE GENERATOR, ENCODER, DECODER, CLIENT, SERVER, AND METHODS USING PARAMETER SETS FOR CODED VIDEO SEQUENCES

(71) Applicant: Fraunhofer-Gesellschaft zur Foerderung der angewandten Forschung e.V., Munich (DE)

(72) Inventors: Yago Sánchez De La Fuente, Berlin (DE); Robert Skupin, Berlin (DE); Cornelius Hellge, Berlin (DE); Thomas Schierl, Berlin (DE); Karsten Grueneberg, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 65 days.

(21) Appl. No.: 18/338,160

(22) Filed: Jun. 20, 2023

(65) Prior Publication Data
US 2023/0336798 A1 Oct. 19, 2023

Related U.S. Application Data

(63) Continuation of application No. PCT/EP2021/086875, filed on Dec. 20, 2021.

(30) Foreign Application Priority Data

Dec. 21, 2020 (EP) .................................... 20216252

(51) Int. Cl.
*H04N 21/2343* (2011.01)
*H04N 21/845* (2011.01)

(52) U.S. Cl.
CPC . *H04N 21/234309* (2013.01); *H04N 21/8456* (2013.01)

(58) Field of Classification Search
CPC ..................... H04N 21/23409; H04N 21/8456
See application file for complete search history.

(56) References Cited

U.S. PATENT DOCUMENTS

2010/0153395 A1 6/2010 Wang et al.
2013/0287366 A1 10/2013 Wang
(Continued)

OTHER PUBLICATIONS

"Information technology—Coding of audio-visual objects—Part 15: Carriage of network abstraction layer (NAL) unit structured video in the ISO base media file format", This part of ISO/IEC 14496 specifies the storage format for streams of video that is structured as NAL Units, such as AVC (ISO/IEC 14496-10) and HEVC (ISO/IEC 23008-2) video streams, 2020, 292 pp.

*Primary Examiner* — Jefferey F Harold
*Assistant Examiner* — Alexander Boyd
(74) *Attorney, Agent, or Firm* — Perkins Coie LLP; Michael A. Glenn

(57) ABSTRACT

The present invention concerns file parsers, file generators encoders, decoders, clients, servers and methods using parameter sets for coded video sequences. Said parameter sets may have decoding parameter information and may be conveyed in-band or out-of band. Some embodiments provide solutions to problems being related with correctly initializing a decoder for decoding coded video sequences in open GOP switching scenarios. Some embodiments may provide for hierarchical track switching levels.

26 Claims, 18 Drawing Sheets

(56) References Cited

U.S. PATENT DOCUMENTS

2018/0103271 A1\* 4/2018 Wang ............... H04N 21/26258
2019/0014363 A1  1/2019 Skupin et al.
2020/0021883 A1\* 1/2020 Stockhammer .. H04N 21/26258
2023/0025332 A1\* 1/2023 Denoual .......... H04N 21/85406

\* cited by examiner

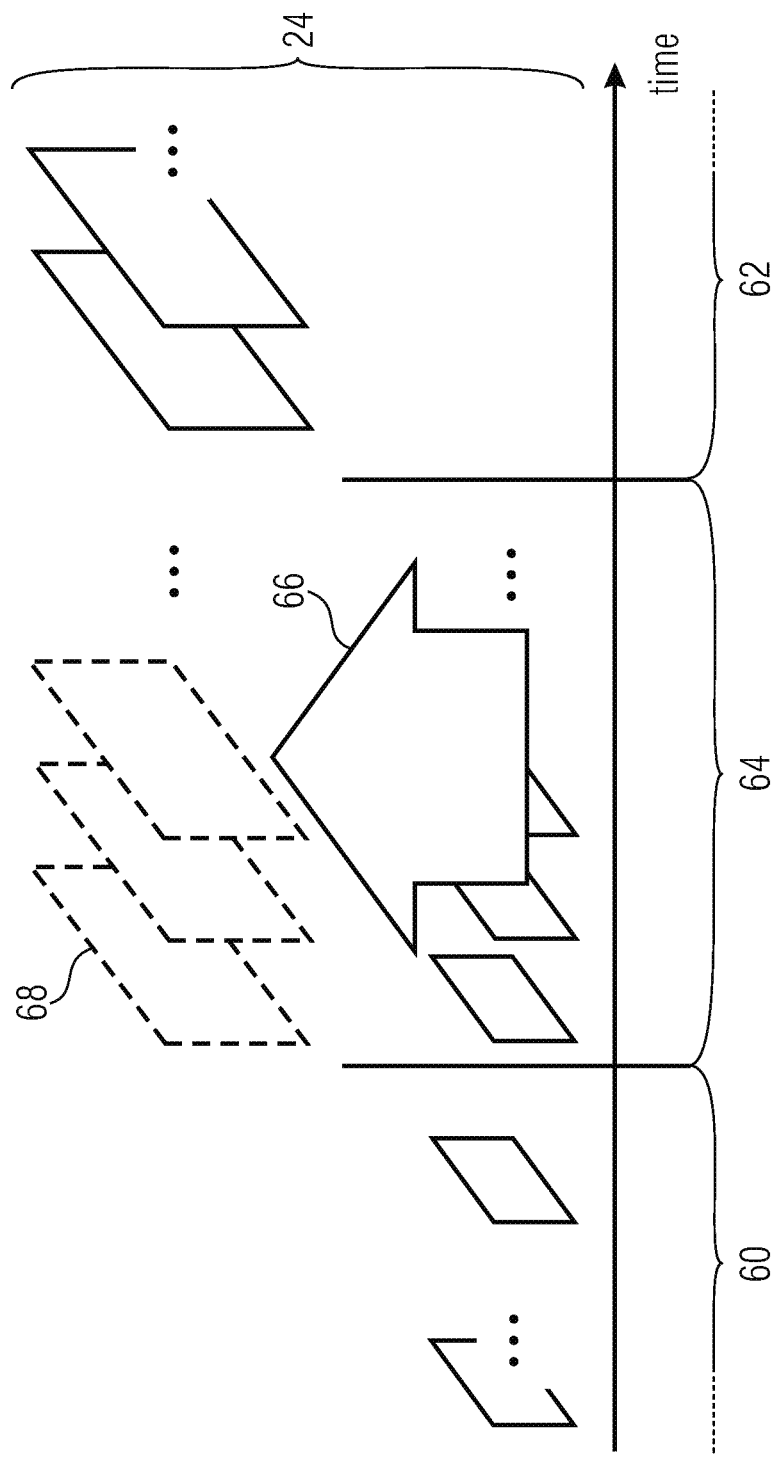

FILE PARSER, FILE GENERATOR, ENCODER, DECODER, CLIENT, SERVER, AND METHODS USING PARAMETER SETS FOR CODED VIDEO SEQUENCES

CROSS-REFERENCE TO RELATED APPLICATIONS

This application is a continuation of copending International Application No. PCT/EP2021/086875, filed Dec. 20, 2021, which is incorporated herein by reference in its entirety, and additionally claims priority from European Application No. 20216252.5, filed Dec. 21, 2020, which is also incorporated herein by reference in its entirety.

TECHNICAL FIELD

The present invention is concerned with video coding. Embodiments of the present disclosure relate to a file parser, a file generator, an encoder, a decoder, a client, a server and corresponding methods for selecting parameter sets for coded video sequences. Some embodiments concern a sample entry selection for stream switching.

BACKGROUND OF THE INVENTION

In the field of video coding, parameter sets may be used, for instance, for initializing a decoding behaviour of a decoder. These parameter sets may comprise decoding parameter information to be used at the start of a coded video sequence, in order to properly decode the pictures contained in said coded video sequence. In some cases, the change of a parameter set may trigger the start of a new coded video sequence.

ISOBMFF allows storage of parameter sets in two different ways. The first one consists of the so called out-of-band parameter set integration, which means that the parameter sets are not stored together with the other non-VCL and VCL NAL units of the AUs (samples in terms of ISOBMFF) but in the sample entry of a track. Basically, the sample entry gives detailed information about the coding type used, and any initialization information needed for that coding. This information includes parameter sets. A particular track may have several sample entries that apply to different parts of the bitstream. For instance, if a bitstream consists of two Coded Video Sequences (CVSs) that each refer to different SPS (with different content) with the same ID, two sample entries are used, in which SPS that have the same ID are stored. Samples within the track point to the proper sample entry that is used, either using the SampleToChunkBox 'stcs' or when the samples come in a fragmented track, e.g. when MPEG-DASH segments are used, the track fragment header of the track contained in e.g. the DASH segment ('tfhd') contain the sample_description_entry that points to which sample entry is used. Thus, the correct out-of-band parameters can be used for decoding the samples as identified by the proper sample description index.

The other alternative is to convey the parameter sets together with the samples as so-called in-band parameter sets and thus they are already present in the bitstream within the AUs as required.

However, particularly for track switching or representation switching in DASH some issues may arise if not tackled properly.

In particular, VVC allows for open GOP resolution switching which is advantageous as a higher efficiency can be achieved compared to closed GOP encoding but a couple of issues need to be taken into account in an adaptive HTTP streaming environment.

Thus, it is an object of the present invention to provide solutions for parameter selection in video coding environments, for example in cases where switching between bitstreams, tracks or representations occurs.

SUMMARY

An embodiment may have a file parser for reconstructing a video bitstream from a video file, wherein the video file has different tracks having at least two input video bitstreams embedded therein, wherein a video content is coded differently in said at least two input video bitstreams, and wherein each input video bitstream has one or more coded video sequences with random access points, wherein the file parser is configured to retrieve from the video file switching information which indicates whether the different tracks have, and/or which of the different tracks are, one or more switch-to candidates for a respective track, and one or more initialization parameter sets to be inserted into a reconstructed bitstream and to be referenced by samples thereof, wherein said reconstructed bitstream has either one of the input video bitstream that is embedded in the respective track, and a mixed video bitstream which results from switching between the input video bitstream that is embedded in the respective track and an input video bitstream that is embedded in the one or more switch-to candidates belonging to the respective track, and wherein the file parser is further configured to provide a decoder with a predetermined initialization parameter set retrieved from the video file for a track of interest and feed the decoder with the input video bitstream that is embedded in the respective track, and/or with a mixed video bitstream resulting from switching between the input video bitstream that is embedded in the respective track and the input video bitstream that is embedded in the one or more switch-to candidates belonging to the respective track.

Another embodiment may have a client network device for retrieving, using a streaming protocol, a media content from a server, wherein the client network device has an inventive file parser as mentioned above.

According to another embodiment, a method for reconstructing a video bitstream from a video file, wherein the video file has different tracks having at least two input video bitstreams embedded therein, wherein a video content is coded differently in said at least two input video bitstreams, and wherein each input video bitstream has one or more coded video sequences with random access points, may have the steps of: retrieving from the video file, switching information which indicates whether the different tracks have, and/or which of the different tracks are, one or more switch-to candidates for a respective track, and one or more initialization parameter sets to be inserted into a reconstructed bitstream and to be referenced by samples thereof, wherein said reconstructed bitstream has either one of the input video bitstream that is embedded in the respective track, and a mixed video bitstream resulting from switching between the input video bitstream that is embedded in the respective track and an input video bitstream that is embedded in the one or more switch-to candidates belonging to the respective track, and providing a decoder with a predetermined initialization parameter set retrieved from the video file for a track of interest and feed the decoder with the input video bitstream that is embedded in the respective track, and/or with a mixed video bitstream resulting from switching between the input video bitstream that is embedded in the respective track and the input video bitstream that is embedded in the one or more switch-to candidates belonging to the respective track.

According to the invention, these solutions are provided by means of the file parser, file generator, encoder, decoder, client, server and corresponding methods according to the independent claims. Advantageous implementations and embodiments are the subject of the dependent claims.

A first aspect concerns a hierarchical track grouping for initialization parameter selection (e.g. in sample entries), as well as a hierarchical entity grouping for initialization parameter selection (e.g. in sample entries), and track grouping with additional/alternative initialization parameters (e.g. in sample entries). In this first aspect, the initialization parameters may be conveyed out-of-band, e.g. in sample entries.

According to this first aspect, a file parser is suggested for reconstructing a video bitstream from a video file, wherein the video file may comprise different tracks having at least two input video bitstreams embedded therein, wherein a video content may be coded differently in said at least two input video bitstreams, and wherein each input video bitstream may comprise one or more coded video sequences (CVS) with random access points. The file parser is configured to retrieve from the video file (e.g. for each representation) switching information that indicates whether the different tracks comprise, and which of the different tracks are, one or more switch-to candidates for the respective track. The term "for each representation" means each DASH representation that may be currently processed by the file parser or a client. That means, the file parser may perform the herein described steps for each representation that is currently processed by the file parser, wherein the file parser may only process one single representation at a time. For example, if representation switching is performed, it may be switched from a first representation to a second representation. Accordingly, the file parser processes the first representation at a first time instance and performs all the steps as described herein on said first representation. After the switch, the file parser processes the second representation at a second time instance and performs all the steps as described herein on said second representation. Accordingly, the file parser performs the steps as described herein "for each representation", in this example for both representations. Of course, if it is switched between more than two representations, the file parser may perform the steps as described herein also for a third representation, a fourth representation, and so on. However, every single representation may only be processed by the file parser at a single time instance, i.e. "for each representation" shall not be construed such that the file parser processes multiple representations at the same time. If representation switching is not performed, i.e. if only one representation is present, then the file parser would only process this one representation. Accordingly, in this case, the file parser may perform the steps as described herein "for each representation", i.e. for this one representation. The file parser is configured to retrieve from the video file (e.g. for each representation) one or more initialization parameter sets to be inserted into a reconstructed bitstream and to be referenced by samples thereof. Said reconstructed bitstream comprises either one of the input video bitstream that is embedded in the respective track or a mixed video bitstream which results from switching between the input video bitstream that is embedded in the respective track and an input video bitstream that is embedded in the one or more switch-to candidates belonging to the respective track. The file parser is further configured to provide a decoder with a predetermined initialization parameter set retrieved from the video file for a track of interest and feed the decoder with the input video bitstream that is embedded in the respective track, and/or with a mixed video bitstream resulting from switching between the input video bitstream that is embedded in the respective track and the input video bitstream that is embedded in the one or more switch-to candidates belonging to the respective track.

Further to this first aspect, a file generator is suggested for generating a video file from at least two input video bitstreams, wherein a video content is coded differently in said at least two input video bitstreams, and wherein each input video bitstream comprises one or more coded video sequences (CVS) with random access points. The file generator is configured to embed the at least two input video bitstreams into different tracks of the video file, which tracks can be switched among each other at the random access points of the embedded input video bitstreams. The file generator is further configured to provide in the video file, for each track, switching information that indicates whether the different tracks comprise, and which of the different tracks are, one or more switch-to candidates for the respective track. The file generator is further configured to provide in the video file one or more initialization parameter sets which are to be inserted into a reconstructed bitstream and to be referenced by samples thereof. Said reconstructed bitstream comprises either one of the input video bitstream that is embedded in the respective track or a mixed video bitstream which results from switching between the input video bitstream that is embedded in the respective track and an input video bitstream that is embedded in the one or more switch-to candidates belonging to the respective track.

Yet further to this first aspect, a method is suggested for reconstructing a video bitstream from a video file, wherein the video file comprises different tracks having at least two input video bitstreams embedded therein, wherein a video content is coded differently in said at least two input video bitstreams, and wherein each input video bitstream comprises one or more coded video sequences (CVS) with random access points. The method comprises a step of retrieving from the video file (e.g. for each representation) switching information that indicates whether the different tracks comprise, and which of the different tracks are, one or more switch-to candidates for the respective track. The method comprises a further step of retrieving from the video file (e.g. for each representation) one or more initialization parameter sets to be inserted into a reconstructed bitstream and to be referenced by samples thereof, wherein said reconstructed bitstream comprises either one of the input video bitstream that is embedded in the respective track or a mixed video bitstream which results from switching between the input video bitstream that is embedded in the respective track and an input video bitstream that is embedded in the one or more switch-to candidates belonging to the respective track. The method further comprises steps of providing a decoder with a predetermined initialization parameter set retrieved from the video file for a track of interest and feed the decoder with the input video bitstream that is embedded in the respective track, and/or with a mixed video bitstream resulting from switching between the input video bitstream that is embedded in the respective track and the input video bitstream that is embedded in the one or more switch-to candidates belonging to the respective track.

Yet further to this first aspect, a method is suggested for generating a video file from at least two input video bitstreams, wherein a video content is coded differently in said at least two input video bitstreams, and wherein each input video bitstream comprises one or more coded video sequences (CVS) with random access points. The method comprises steps of embedding the at least two input video bitstreams into different tracks of the video file, which tracks can be switched among each other at the random access points of the embedded input video bitstreams, and providing in the video file, for each track, switching information which indicates whether the different tracks comprise, and which of the different tracks are, one or more switch-to candidates for the respective track. The method further comprises a step of providing in the video file, for each track, one or more initialization parameter sets which are to be inserted into a reconstructed bitstream and to be referenced by samples thereof, wherein said reconstructed bitstream comprises either one of the input video bitstream that is embedded in the respective track, and a mixed video bitstream which results from switching between the input video bitstream that is embedded in the respective track and an input video bitstream that is embedded in the one or more switch-to candidates belonging to the respective track.

Yet further to this first aspect, a computer program is suggested for implementing the method of this first aspect when being executed on a computer or signal processor.

Yet further to this first aspect, a client network device is suggested for retrieving, using a streaming protocol, a media content from a server, wherein the client network device comprises a file parser according to this first aspect.

Yet further to this first aspect, a server network device for providing, using a streaming protocol, a media content to a client, wherein the server network device comprises a file generator according to this first aspect.

Yet further to this first aspect, a system is suggested comprising a client network device and a server network device according to this first aspect.

A second aspect is concerned with streaming systems, like DASH, for instance. According to this second aspect, a client network device is suggested for retrieving, using a streaming protocol, a media content from a server, wherein the media content is contained in one or more media streams, each of which containing one or more representations, wherein each representation comprises one or more tracks containing samples referring to pictures of a video content, wherein said pictures are coded in one or more coded video sequences (CVS) of one or more bitstreams. Each of the representations is associated with an Initialization Segment comprising one or more initialization parameter sets (e.g. sample description boxes) for those tracks contained in the respective representation, wherein each initialization parameter set contains decoding parameter information to be inserted into a reconstructed bitstream at the start of a coded video sequence and to be referenced by samples thereof. The client network device is configured to derive initialization segment information from the one or more media streams indicating that a predetermined initialization segment of a predetermined representation can be used for another representation.

Further to this second aspect, a corresponding server network device is suggested for providing, using a streaming protocol, a media content to a client, wherein the media content is conveyed in one or more media streams, each of which containing one or more representations, wherein each representation comprises one or more tracks containing samples referring to pictures of a video content, wherein said pictures are coded in one or more coded video sequences (CVS) of one or more bitstreams. Each of the representations is associated with an Initialization Segment comprising one or more initialization parameter sets (e.g. sample description boxes) for those tracks contained in the respective representation, wherein each initialization parameter set contains decoding parameter information to be inserted into a reconstructed bitstream at the start of a coded video sequence and to be referenced by samples thereof. The server network device is configured to convey initialization segment information with the one or more media streams indicating that a predetermined initialization segment of a predetermined representation can be used for another representation.

Yet further to this second aspect, a system is suggested comprising a client network device according to this second aspect and a server network device according to this second aspect.

Yet further to this second aspect, a method is suggested for retrieving, using a streaming protocol, a media content from a server, wherein the media content is contained in one or more media streams, each of which containing one or more representations, wherein each representation comprises one or more tracks containing samples referring to pictures of a video content, wherein said pictures are coded in one or more coded video sequences (CVS) of one or more bitstreams. Each of the representations is associated with an Initialization Segment comprising one or more initialization parameter sets (e.g. sample description boxes) for those tracks contained in the respective representation, wherein each initialization parameter set contains decoding parameter information to be inserted into a reconstructed bitstream at the start of a coded video sequence and to be referenced by samples thereof. The method further comprises a step of deriving initialization segment information from the one or more media streams indicating that a predetermined initialization segment of a predetermined representation can be used for another representation.

Yet further to this second aspect, a method is suggested for providing, using a streaming protocol, a media content to a client, wherein the media content is conveyed in one or more media streams, each of which containing one or more representations, wherein each representation comprises one or more tracks containing samples referring to pictures of a video content, wherein said pictures are coded in one or more coded video sequences (CVS) of one or more bitstreams. Each of the representations is associated with an Initialization Segment comprising one or more initialization parameter sets (e.g. sample description boxes) for those tracks contained in the respective representation, wherein each initialization parameter set contains decoding parameter information to be inserted into a reconstructed bitstream at the start of a coded video sequence and to be referenced by samples thereof. The method further comprises a step of conveying initialization segment information with the one or more media streams indicating that a predetermined initialization segment of a predetermined representation can be used for another representation.

A third aspect concerns a grouping of samples for alternative initialization parameter sets that are conveyed in-band. According to said third aspect, a file parser is suggested for reconstructing a video bitstream from a video file, wherein the video file comprises one or more tracks, each having one or more input video bitstreams embedded therein, wherein each of said one or more input video bitstreams comprises one or more coded video sequences (CVS).

The file parser is configured to retrieve from the video file (e.g. for each representation) one or more Sample Groups to which one or more samples of said one or more tracks belong, and an indication which samples belong to which Sample Group. Each Sample Group is associated with at least one initialization parameter set to be inserted into a reconstructed bitstream and to be referenced by samples thereof. The file parser is further configured to provide a decoder with a predetermined initialization parameter set of a predetermined Sample Group.

Further to said third aspect, a file generator is suggested for generating a video file from one or more input video bitstreams, into which a video content is coded, wherein the video file comprises one or more tracks in which said one or more input video bitstreams are embedded, wherein each of said one or more input video bitstreams comprises one or more coded video sequences (CVS). The file generator is configured to group one or more samples of a track into at least one Sample Group and to mark said one or more samples as belonging to said at least one Sample Group, wherein each Sample Group is associated with at least one initialization parameter set to be used at a start of the one or more coded video sequences (CVS).

Yet further to this third aspect, a system is suggested comprising a file parser according to the third aspect and a file generator according to the third aspect.

Yet further to this third aspect, a client network device is suggested comprising a file parser according to the third aspect, wherein the client is configured to download a video file from a server network device, and wherein the file parser is configured to generate a reconstructed video bitstream from the file being downloaded from the server network device.

Yet further to this third aspect, a server network device is suggested comprising a file generator according to the third aspect, wherein the file generator is to generate a video file, and wherein the server is configured to transmit said video file to a client network device.

Yet further to this third aspect, a system is suggested comprising a server according to the third aspect and a client according to the third aspect, wherein the server is configured to generate a video file, and wherein the client is to download said video file from the server.

Yet further to this third aspect, a method is suggested for reconstructing a video bitstream from a video file, wherein the video file comprises one or more tracks, each having one or more input video bitstreams embedded therein, wherein each of said one or more input video bitstreams comprises one or more coded video sequences (CVS). The method comprises steps of retrieving from the video file (e.g. for each representation) one or more Sample Groups to which one or more samples of said one or more tracks belong, and an indication which samples belong to which Sample Group. Each Sample Group is associated with at least one initialization parameter set to be inserted into a reconstructed bitstream and to be referenced by samples thereof. The method further comprises a step of providing a decoder with a predetermined initialization parameter set of a predetermined Sample Group.

Yet further to this third aspect, a method is suggested for generating a video file from one or more input video bitstreams, into which a video content is coded, wherein the video file comprises one or more tracks in which said one or more input video bitstreams are embedded, wherein each of said one or more input video bitstreams comprises one or more coded video sequences (CVS). The method comprises steps of grouping one or more samples of a track into at least one Sample Group and marking said one or more samples as belonging to said at least one Sample Group, wherein each Sample Group is associated with at least one initialization parameter set to be used at a start of the one or more coded video sequences (CVS).

A fourth aspect concerns signaling of additional decoding requirements. According to this fourth aspect a decoder is suggested for decoding pictures of a video content contained in an input video bitstream, wherein the decoder is configured to initialize its decoding behavior, for decoding the pictures of the video content, by using predetermined decoding parameter information prior to a start of decoding a coded video sequence, wherein the pictures are arranged in one or more consecutively arranged coded video sequences (CVS), each coded video sequence (CVS) being associated with its own sequence-related initialization parameter set carrying sequence-related decoding parameter information. The decoder is configured to derive a signal (dci_extension_flag), said signal indicating towards the decoder to use for its initialization, instead of sequence-related decoding parameter information, global bitstream-related decoding parameter information (dci_extension), which indicates a predetermined global decoding capability for all coded video sequences (CVS) contained in the entire input video bitstream, wherein said global bitstream-related decoding parameter information is conveyed in a metadata NAL unit (DCI) or in an SEI message.

Further to this fourth aspect, an encoder is suggested for encoding pictures of a video content into a video bitstream, wherein the pictures are arranged in one or more coded video sequences (CVS), wherein the encoder is configured to provide predetermined decoding parameter information to be used by a decoder to initialize its decoding behavior, at a start of a coded video sequence (CVS), for decoding the pictures contained in said decoding video sequence (CVS), wherein each coded video sequence (CVS) is associated with its own sequence-related initialization parameter set (SPS) carrying sequence-related decoding parameter information. The encoder is configured to encode a signal (dci_extension_flag) into the bitstream, said signal indicating towards the decoder to use for its initialization, instead of sequence-related decoding parameter information, global bitstream-related decoding parameter information (dci_extension), which indicates a predetermined global decoding capability for all coded video sequences (CVS) contained in the entire input video bitstream, wherein said global bitstream-related decoding parameter information is conveyed in a metadata NAL unit (DCI) or in an SEI message.

Yet further to this fourth aspect, a method is suggested for decoding pictures of a video content contained in an input video bitstream, the method comprising initializing a decoding behavior of a decoder, for decoding the pictures of the video content, by using predetermined decoding parameter information prior to a start of decoding a coded video sequence, wherein the pictures are arranged in one or more consecutively arranged coded video sequences (CVS), each coded video sequence (CVS) being associated with its own sequence-related initialization parameter set carrying sequence-related decoding parameter information. The method further comprises a step of deriving a signal (dci_extension_flag) indicating to use, for the initialization of the decoding behavior of the decoder, instead of sequence-related decoding parameter information, global bitstream-related decoding parameter information (dci_extension), which indicates a predetermined global decoding capability for all coded video sequences (CVS) contained in the entire input video bitstream. Said global bitstream-related decoding parameter information is conveyed in a metadata NAL unit (DCI) or in an SEI message.

Yet further to this fourth aspect, a method is suggested for encoding pictures of a video content into a video bitstream, wherein the pictures are arranged in one or more coded video sequences (CVS). The method comprises a step of providing predetermined decoding parameter information to be used by a decoder to initialize its decoding behavior, at a start of a coded video sequence (CVS), for decoding the pictures contained in said decoding video sequence (CVS), wherein each coded video sequence (CVS) is associated with its own sequence-related initialization parameter set (SPS) carrying sequence-related decoding parameter information. The method further comprises a step of encoding a signal (dci_extension_flag) into the bitstream, said signal indicating towards the decoder to use for its initialization, instead of sequence-related decoding parameter information, global bitstream-related decoding parameter information (dci_extension), which indicates a predetermined global decoding capability for all coded video sequences (CVS) contained in the entire input video bitstream. Said global bitstream-related decoding parameter information is conveyed in a metadata NAL unit (DCI) or in an SEI message.

Yet further to this fourth aspect, it is suggested to provide a bitstream to be obtained by a method according to this fourth aspect.

Yet further to this fourth aspect, a computer program is suggested for implementing the methods of decoding and encoding according to this fourth aspect, when being executed on a computer or signal processor.

According to a fifth aspect, instead of signalling the respective parameter values, a client/player is advised or used to allocate a maximum value of at least one of the initialization parameters.

According to this fifth aspect, a player is suggested comprising a decoder for decoding pictures of a video content contained in an input video bitstream, wherein the pictures are arranged in one or more consecutively arranged coded video sequences (CVS), each coded video sequence (CVS) being associated with its own sequence-related initialization parameter set (SPS) carrying sequence-related decoding parameter information. The decoder is configured to initialize its decoding behavior, for decoding the pictures of the video content, by using at least one initialization parameter of a signaled global bitstream-related decoding parameter information (dci_extension) instead of the sequence-related decoding parameter information (SPS) prior to a start of decoding a particular coded video sequence (CVS). The player is advised or used to allocate a maximum value of at least one of the initialization parameters of the global bitstream-related decoding parameter information (dci_extension) for defining a minimum decoding requirement of the decoder for being able to decode, without a re-initialization, all coded video sequences (CVS) inside the bitstream which comply with these minimum decoding requirements.

BRIEF DESCRIPTION OF THE DRAWINGS

Embodiments of the present application are described below with respect to the figures, among which.

DETAILED DESCRIPTION OF THE INVENTION

Figure 1A:
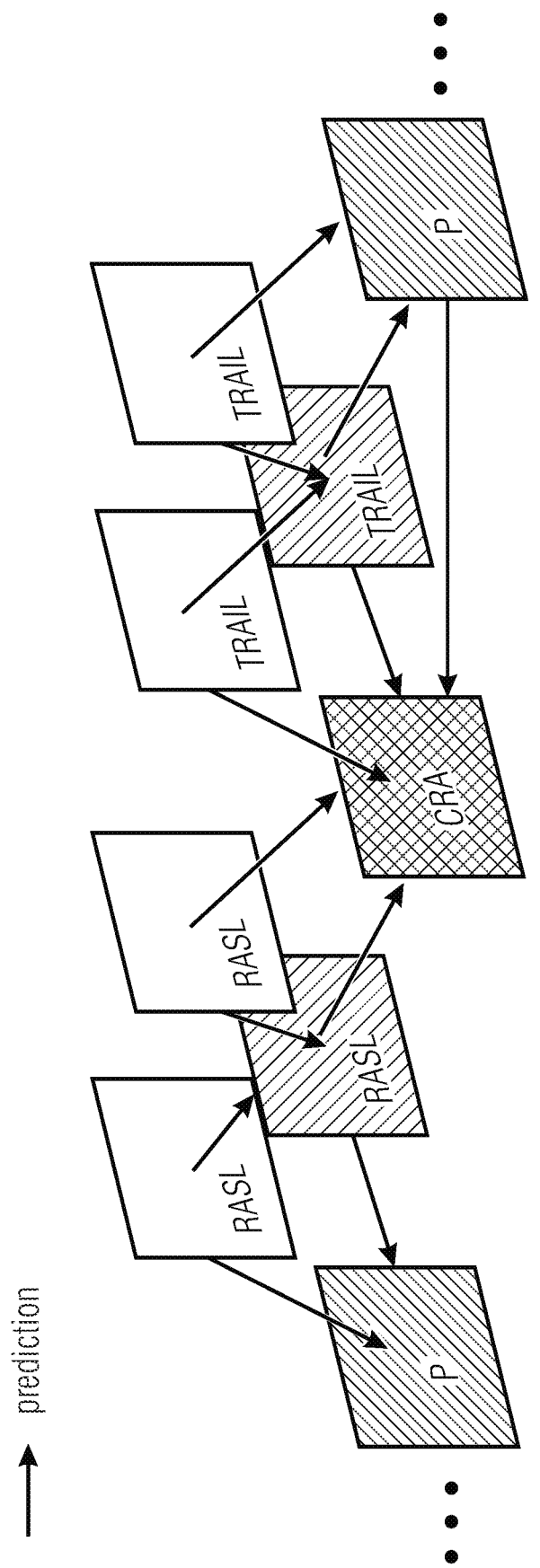
FIG. 1A shows a diagram illustrating a video data stream having a video encoded therein using an open GOP structure, wherein Figure OA shows the pictures of the video data stream in presentation time order.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

The description of the present application with respect to the figures starts with an introduction of open GOP structures in video streaming using an adaptive streaming protocol, e.g. DASH, wherein switching between representations of the video relating to different spatial resolution is enabled.

1. Introduction

Open GOP structures allow for a more efficient compression of a video than closed GOP structures at the same Random Access periodicity. As shown in FIG. 0A, when randomly accessing a stream encoded with an open GOP structure, there are certain pictures, denoted RASL in FIG. 1A, that are not properly decoded since their references are missing and, therefore, are not reproduced/output/shown.

FIG. 1A shows an open GOP structure in output order using the HEVC and VVC nomenclature in indicating the picture types. The Random Access point is here the Clean Random Access (CRA) picture and the Random Access Skip Leading (RASL) pictures are the random access dependent pictures that cannot be shown to the user since, when random accessing at the CRA picture, the reference P picture shown at the figure at the left-hand side is missing.

Figure 1B:
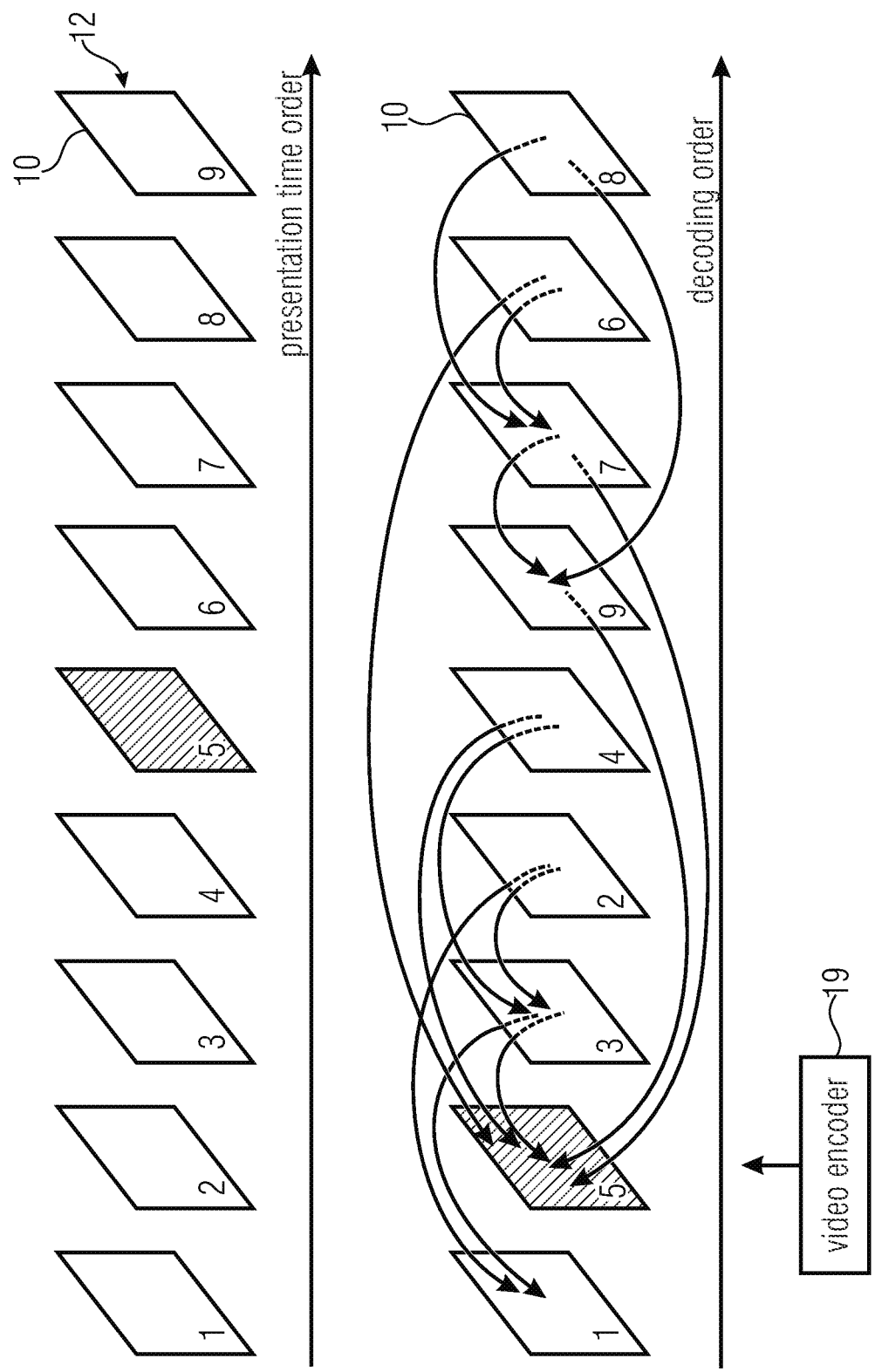
FIG. 1B shows a schematic diagram illustrating a path of pictures of a video data stream having coded therein the pictures using an open GOP structure in presentation time order and, at the bottom half, in decoding order wherein the open GOP structure corresponds to the one of Figure OA and merely servers as an example.

In order to render this description easier, reference is made to FIG. 1B which shows, on the top of FIG. 1B, a sequence of nine pictures 10 of a video 12 in presentation time order. Pictures 10 are numbered from 1 to 9 along the presentation time order. At the bottom of FIG. 1B, the pictures 10 are shown in their decoding order at which the same are encoded into a data stream. FIG. 1B illustrates the case where pictures 10 are encoded into a data stream using the open GOP structure illustrated in FIG. 1A. The numbering of the pictures 10 in the bottom half of FIG. 1B shows that the pictures 10 are temporally rearranged, i.e., that the decoding order deviates from the presentation time order.

In particular, FIG. 1B shows that the fifth picture 10 in presentation time order is coded as a random access point (RAP) picture. That is, the fifth picture in presentation time order or picture number 5, is coded without dependencies on any picture of another presentation time and preceding in decoding order. As shown in FIG. 1B, pictures number 2 to number 4 are coded in a manner directly or indirectly referencing, by temporal prediction, picture number 5, i.e., the random access point picture and another picture, namely here picture number 1, which precedes the random access point picture both in terms of presentation time order as well as decoding order. For example, picture number 3 directly references, by temporal prediction, picture number 5 and picture number 1. That is, picture number 3 is temporally predicted by way of motion compensated prediction, for instance, on the basis of picture number 5 and number 1. Picture number 4 does not directly reference, by temporal prediction, picture 1, but indirectly, namely via picture number 3. That is, the set of pictures numbers 2, 3 and 4 have in common that: 1) they directly or indirectly reference, by temporal prediction, a random access point picture, here exemplary picture number 5 and, 2) directly or indirectly reference, by temporal prediction, a reference picture preceding, in terms of presentation time order and decoding order, the directly or indirectly referenced random access point picture, in FIG. 1B exemplary reference picture number 1. This set of pictures is liable to be skipped if random access point picture number 5 is used for random accessing the video data stream into which video 10 is encoded using an open GOP structure since the reference picture number 1 for this set of pictures numbers 2, 3 and 4 would be missing as it lies, in decoding order, upstream the random access point picture number 5.

Besides using open GOP structure for typical broadcast scenarios, where skipping some of the pictures such as RASL pictures when random accessing, for instance during channel switching between programs, is acceptable, open GOP structures have shown to be valuable for adaptive streaming such as DASH where switching to one or another stream with a different quality is done aligned with random access point pictures such as CRAs without skipping pictures. As long as the resolution is the same and the streams are authored carefully, it is possible to switch between two streams and to concatenate or stitch two streams with different qualities and obtain a specification conformant bitstream that can form a single video sequence from the view point of the video codec specification.

Figure 1C:
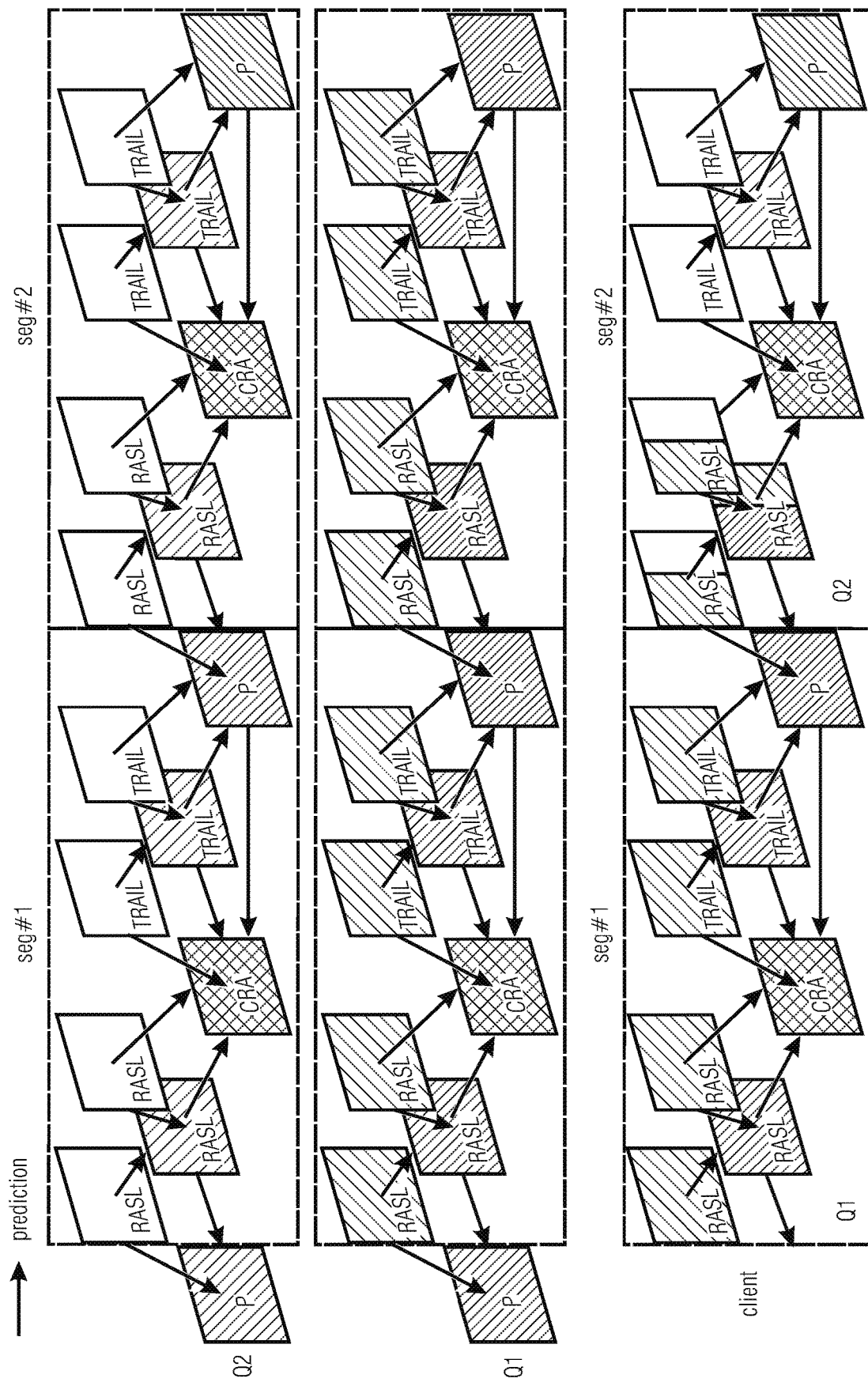
FIG. 1C shows a schematic diagram illustrating two separately/independently coded video data streams, temporally subdivided into segments for adaptive streaming, at the top half, and at the bottom half the stitched data stream arriving at a client at a transition from lower quality to higher quality.

The latter circumstance is illustrated with respect to FIG. 1C which shows at the top half thereof, two representations Q1 and Q2 of a video and, in particular, two consecutive temporal segments Seg #1 and Seg #2 thereof. At the bottom half of FIG. 1C, those temporal segments are illustrated in concatenation which are actually retrieved by a client from the server. As illustrated in the example of FIG. 1C, the client has chosen to retrieve temporal segment Seg #1 from the representation Q1 and the subsequent temporal segment Seg #2 from representation Q2. In other words, FIG. 1C illustrates an example where a client downloads a first segment Seg #1 at a first representation, e.g. at a first quality Q1, followed by a second temporal segment Seg #2 at a second representation, e.g. at a second quality Q2.

As was the case with FIGS. 1A and 1B, FIG. 1C illustrates the interdependencies among the pictures shown by way of arrows which point from the picture predictively coded to the respective reference picture referenced, here by temporal prediction, by the respective picture. Each segment starts, in decoding order, with a CRA picture, i.e., a random access point picture but, in the presentation time order at which the pictures are shown to be ordered in FIG. 1C, this random access point picture of each segment is preceded by RASL pictures. The explanation of this circumstance has been explained above with respect to FIG. 1B.

By switching from the first representation, e.g. from quality Q1, to the second representation, e.g. to quality Q2, the reference pictures for the RASL pictures of the second segment of data stream Q2 did not get lost: within stream Q2, the RASL pictures of the second segment of stream Q2 reference picture P of the first segment of stream Q2, and within the stitched data stream where the second segment of stream Q2 follows the first segment of stream Q1, these RASL pictures refer to the temporally aligned low quality picture P of the first segment of quality Q1 as a substitute. FIG. 1C illustrates the effect of this reference picture change. In particular, FIG. 1C depicts the pictures of representation Q2 in a shaded form, whereas pictures of representation Q1 are depicted without shading. In the stitched or concatenated stream where the segment of quality Q2 follows the first segment of quality Q1, the RASL pictures of the second segment of quality Q2 are depicted in one half without shading and the other half with shading, thereby indicating that the result of decoding these RASL pictures is neither the result of the corresponding RASL pictures when decoding the continuous stream of Q2 or Q1.

However, besides being specification conformant, if they are authored properly, the quality degradation with respect to Q2 is not significant. This can already be signaled with the attribute @mediaStreamStructure in the Media Presentation Description (MPD) for DASH, i.e., within the manifest file.

Additional measures are used at the decoder when the different qualities Q1 and Q2 do not have the same resolution, since reference pictures used for open GOP switching are not present at the proper resolution. This means that it may not always be possible to perform open GOP switching with resolution change when a decoder was initially initialized with initialization parameters of a predetermined quality, e.g. if the decoder was initially initialized with initialization parameters belonging to a lower quality, a switch from the low quality to the high quality stream may not be possible without re-initializing the decoder.

Figure 1D:
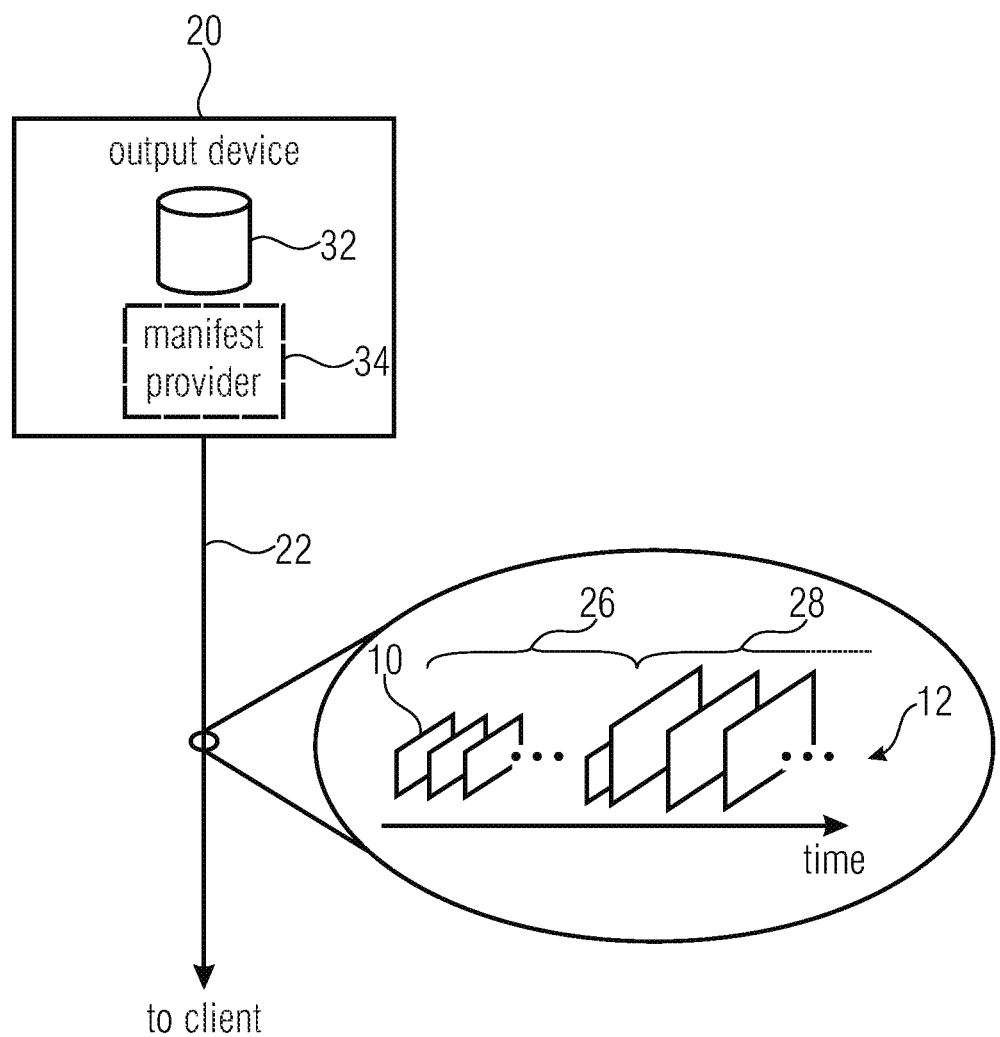
FIG. 1D shows a schematic diagram illustrating an exemplary server network device.

Initially, in order to ease the understanding of the following more detailed description of the various embodiments of the present application, FIG. 1D shows a device for outputting, using an adaptive streaming protocol, a video to a client. The device is denoted as output device in FIG. 1D and indicated using reference sign 20. The output device 20 acts, accordingly, as a streaming server and the adaptive streaming protocol used by device 20 may be DASH or any other adaptive streaming protocol. Accordingly, the device 20 may herein also be referred to as a server network device. The device 20 may be implemented in the form of hardware, firmware or software. When implemented in hardware, device 20 may, for instance, be an integrated circuit. If implemented in firmware, device 20 may be an FPGA and, if implemented in software, device 20 may comprise one or more processes programmed by an appropriate computer program.

The device 20 supports switching between, at least, outputting the video 12 at a first spatial resolution and outputting the video 12 at a second spatial resolution. That is, the stream 22 output by output device 20 to the client may represent, or have encoded therein, the video 12 at a spatial resolution which varies in time and switches, for instance, between a first spatial resolution and a second spatial resolution which is greater than the first spatial resolution. The "spatial resolution" is, for instance, measured in samples per picture. FIG. 1D, for instance, illustrates that output device 20 outputs the video 12 by means of stream 22 at a first spatial resolution during a first temporal interval 26 and at a second spatial resolution during a second temporal interval 28. During the first temporal interval 26, stream 22 represents the pictures 10 of video 12 at the first spatial resolution, and during the second temporal interval 28, stream 22 represents the pictures 10 at the second spatial resolution.

The fact that output device 20 supports switching between outputting the video 12 at the first spatial resolution and outputting the video 12 at the second spatial resolution may, for instance, manifest itself in the ability of the client to retrieve from output device 20 the video 12 at the different spatial resolutions by requesting particular representations to the output device 20. As explained later on, output device 20 may, for instance, be a combination of a storage 32 storing an appropriately conceptualized data structure on the one hand and a manifest provider 34 on the other hand. Manifest provider 34 may, for instance, provide the client with a manifest which describes as to how a client may access storage 32 by respective requests. In doing so, the client, on the basis of the manifest, may select between temporal segments having encoded therein the video 12 at the first spatial resolution and temporal segments having encoded therein the video 12 at the second spatial resolution.

Figure 1E:
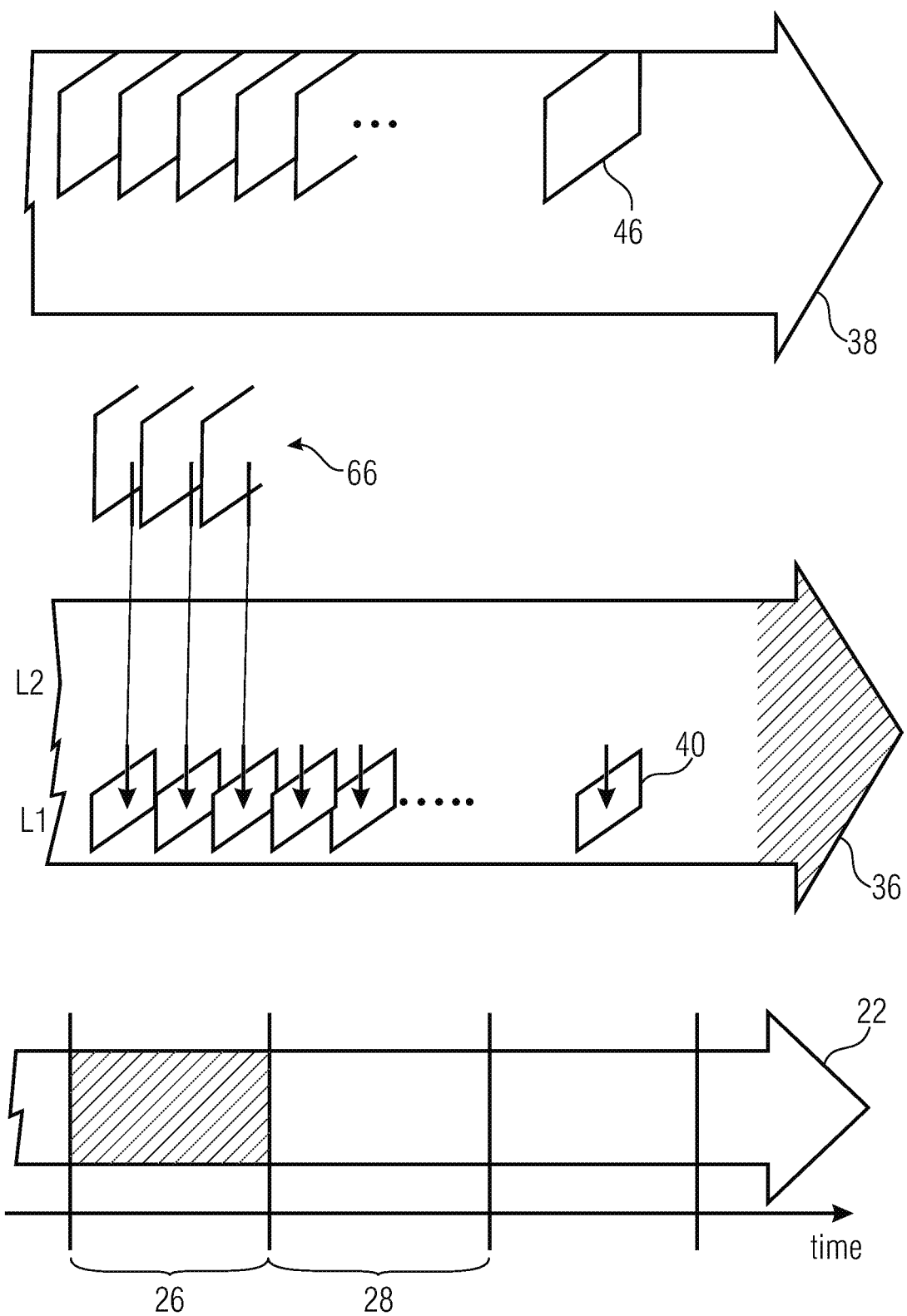
FIG. 1E shows a schematic diagram illustrating a layered video stream and an increased spatial resolution video stream used by the server network device of Figure OD.

FIG. 1E illustrates the usage of open GOP structures for representing and encoding the video 12 at the increased spatial resolution while, nevertheless, avoiding the loss of random access dependent pictures as presented with respect to FIG. 1B in case of switching between the spatial representations, may be prevented from resulting into loss of pictures. In particular, FIG. 1E illustrates a switch, in time, between outputting the video in form of a low-resolution video stream 36 and an increased spatial resolution video stream 38. That is, the stream 22 output by output device 20 changes between temporal intervals 26 where the output stream 22 is the low-resolution video stream 36 and temporal intervals 28 where the output stream 22 is the increased spatial resolution video stream 38. For example, the low-resolution video stream 36 output during interval 26 represents the video during interval 26 and is concatenated or stitched with the increased spatial resolution video stream 38 which represents or has encoded therein the video at the, for example, temporally succeeding interval 28.

The problem of switching from the low-resolution video stream 36 to the increased resolution video stream 38 is solved by exploiting RPR functionality of the decoder at client side: the decoder is able to upsample 66 reference pictures of resolution other than referencing pictures, quasi on the fly. The only issue to be solved is the correct initialization of the decoder, its correct preparation, since the decoder is prepared to deal with some maximum size of pictures. Thus, no picture may be larger than some picture size initially indicated to the decoder.

Figure 1F:
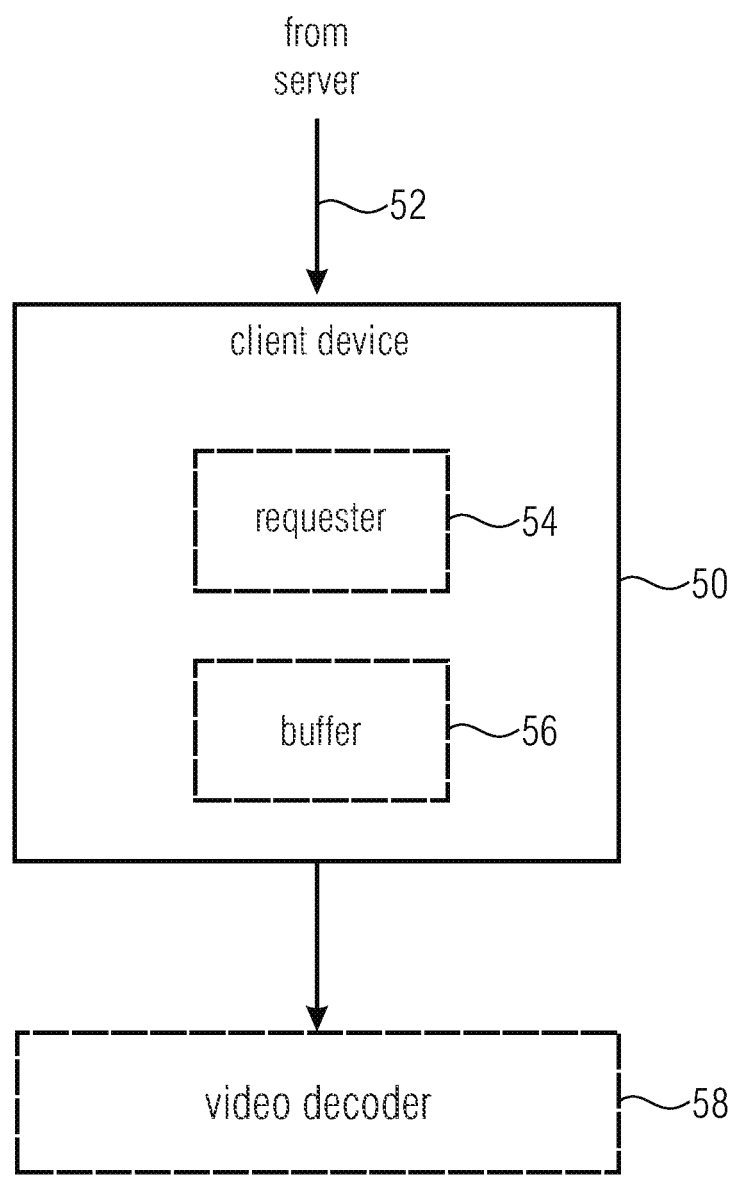
FIG. 1F shows a schematic diagram illustrating an exemplary client network device.

FIG. 1F shows a device for retrieving, using an adaptive streaming protocol, a video from a server such as the output device of FIG. 1D. The device of FIG. 1F is denoted as client device 50 and may, as was the case with respect to the output device 20, be implemented in hardware, firmware or software. That is, device 50 may be an integrated circuit, an appropriately programmed FPGA or one or more processes appropriately programmed by an appropriate computer program.

The client device 50, which may also be referred to as a client network device, supports switching between retrieving a video at the first spatial resolution and retrieving the video at the second spatial resolution. To this end, client device 50 retrieves a stream 52 of temporal segments from the server 20 which are selected, per temporal segment, out of different versions of the video or different streams representing the video at different bit rates. For example, stream 52 may be stream 22 of FIGS. 1D and 1E, with client device 50 switching between retrieving the video via low-resolution video stream 36 and increased spatial resolution video stream 38 corresponding to a higher bit rate than the layered video stream 36.

Internally, client device 50 may comprise a requester 54 responsible for requesting, for example, the aforementioned manifest from the server and sending requests to the server 20 for fetching the temporal segments of the streams offered by the server 20, such as temporal segments of streams 36 and 38 between which requester 54 switches in order to, for example, avoid buffer over- or underflow. For example, client device 50 also comprises a buffer 56 for buffering the inbound temporal segments fetched by requester 54 before they are subject to decoding by forwarding the buffered temporal segment to a video decoder 58. The video decoder 58 may be part of the client device 50 or may be external thereto. FIG. 1F illustrates the video decoder 58 as being external to the client device 50.

Device 50, thus, receives stream 52 from server 20 by requesting temporal segments of different streams having encoded therein the video at different bit rates and outputs or forwards stream 52 to video decoder 58, thereby retrieving the video at varying spatial resolution.

In order to illustrate the latter circumstance and how the device 50 enables the usage of open GOP structure for encoding the video into stream 52 at the second spatial resolution without loss of random access dependent pictures, reference is made to FIG. 1G. As shown in FIG. 1G, client device 50 retrieves within first temporal portions 60 and 64 the video 24 at a first spatial resolution and within a third temporal portion 62 at the second, increased spatial resolution. FIG. 1G illustrates this by depicting the pictures of video 24 at different sizes. That is, during the temporal portions 60 and 64, client device 50 retrieves temporal segments of a first stream offered, or rendered available for output, at the server and during the temporal portion 62, client device 50 retrieves temporal segments of another stream offered, or rendered available for download, at the server. However, within the second temporal portion 64 some pictures are needed as reference for pictures within portion 62. Thus, client device's 50 decoder (internal thereto, not shown separately) upsamples the low-resolution pictures to the increased spatial resolution by way of upsampling from the first to the second spatial resolution as illustrated by arrow 66. By this measure, pictures of the second spatial resolution may obtain their correct temporal predictors. That is, the representation downloaded by client device 50 during temporal phase 62 may be encoded using open GOP structure and, nevertheless, the random access dependent pictures may be prevented from being lost.

The subsequently described embodiments achieve instruments to correctly prepare/configure the decoder so as to be prepared to deal with the maximum pictures sizes even if the client, for instance, decides to download the video at a lower resolution first before switching to the higher resolution representation.

Figure 1H:
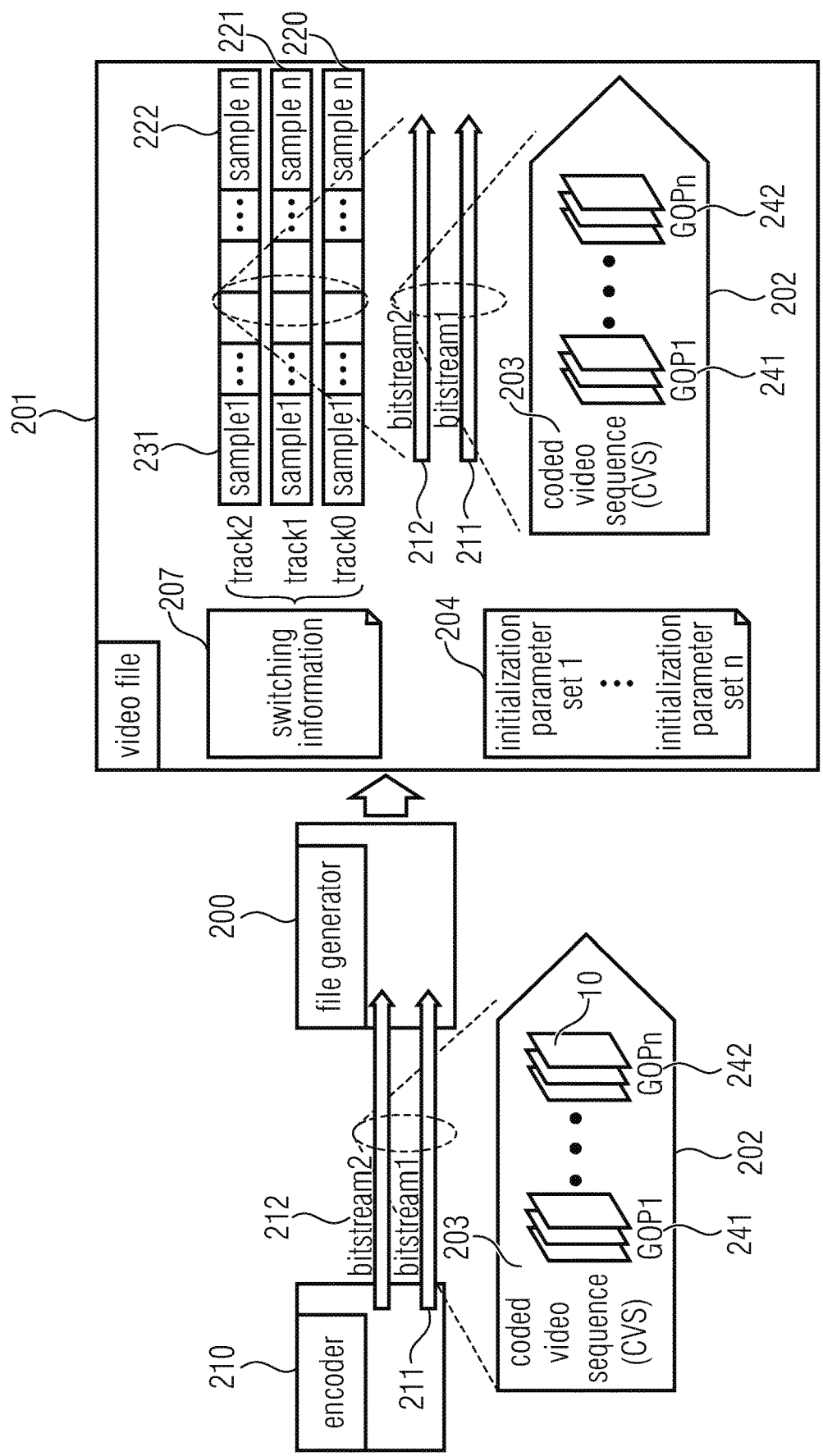
FIG. 1G shows a schematic diagram illustrating the mode of operation of the exemplary client network device of Figure OF, FIG. 1H shows a schematic diagram illustrating a file generator in accordance with an embodiment of the present application.
FIG. 1J shows a schematic diagram illustrating a file parser in accordance with an embodiment of the present application.

FIG. 1H shows an embodiment of the present invention. It shows a file generator 200 which receives at least two input video bitstreams 211, 212 from an encoder 210. The two input video bitstreams 211, 212 may contain a video content 202 that may be coded differently (e.g. in different spatial resolutions, like 1080p, 4 k, 8 k, and the like) in said at least two input video bitstreams 211, 212. Each input video bitstream 211, 212 comprises one or more coded video sequences (CVS) 203 with random access points, e.g. CRA as explained above. As can be seen, the pictures 10 contained in said two input video bitstreams 211, 212 may be coded in an open GOP structure.

These two input video bitstreams 211, 212 may be fed from the encoder 210 to the file generator 200. The file generator 200 may be configured to generate a video file 201 from said at least two input video bitstreams 211, 212. As can be seen, the at least two input video bitstreams 211, 212 may be embedded in one or more tracks 220, 221, 222 labelled with Track0, Track1 and Track2 in FIG. 1H.

More particularly, each track 220, 221, 222 may be subdivided into samples 231. Said samples 231 may comprise the video content 202. In other words, the video content 202, i.e. the pictures 10 coded in the at least two input video bitstreams 211, 212, may be embedded (and distributed) in the samples 231 of the tracks 220, 221, 222.

As mentioned above, the video content 202 may comprise one or more coded video sequences (CVS) 203. Each coded video sequence 203 may comprise one or more Group of Pictures (GOP) 241, 242. Each coded video sequence (CVS) 203 may be associated with one or more initialization parameter sets 204 carrying decoding parameter information.

These initialization parameter sets 204 may comprise information (e.g. decoding parameter information) that is intended for a decoder to initialize its decoding behavior. Initialization parameter sets 204 may be sequence-related parameter sets, comprising decoding parameter information that is valid for a coded video sequence (CVS) 203. An example would be an SPS (Sequence Parameter Set) as defined in VVC. Additionally or alternatively, initialization parameter sets 204 may be picture-related parameter sets, comprising decoding parameter information that is valid for each picture of a coded video sequence (CVS) 203. An example would be a PPS (Picture Parameter Set) as defined in VVC. Additionally or alternatively, initialization parameter sets 204 may be video-related parameter sets, comprising decoding parameter information that is valid for an entire video content 202. An example would be a VPS (Video Parameter Set) as defined in VVC. Additionally or alternatively, initialization parameter sets 204 may be global bitstream-related parameter sets, comprising decoding parameter information that is valid for the entire bitstream 211, 212.

The one or more initialization parameter sets 204 may be inserted into a reconstructed bitstream and may be referenced by samples 231 of the one or more tracks 220, 221, 222.

As mentioned above, said one or more initialization parameter sets (e.g. PPS, SPS, VPS) 204 may comprise information that is intended for a decoder to initialize its decoding behavior. For example, the decoding parameter information contained in an initialization parameter set 204 may indicate a predetermined (e.g. a highest) entailed decoding capability for decoding the respective pictures and/or coded video sequence (CVS) and/or video content and/or bitstream.

For example, if the video content 202 contained in the input video bitstreams 211, 212 may be coded in a predetermined spatial resolution, e.g. in 4 k, then the initialization parameter set 204 may comprise decoding parameter information to inform the decoder to initialize its decoding behavior so as to be prepared and enabled to decode 4 k coded video content.

For example, in case of a sequence-related initialization parameter set 204 (e.g. an SPS), the decoder initializes its decoding behavior prior to the start of a coded video sequence (CVS) 203. Each coded video sequence (CVS) 203 may be associated with its own sequence-related initialization parameter set 204, wherein the pictures 10 contained in said coded video sequence 203 refer to said initialization parameter set 204. Accordingly, in case of closed GOP switching, a new coded video sequence 203 is started at a switching point (e.g. at an (I)RAP NAL unit), wherein the pictures 10 contained in the new (switch-to) coded video sequence 203 refer to a new initialization parameter set 204 being associated with said new (switch-to) coded video sequence (CVS) 203. In other words, if a new initialization parameter set is signaled, a new coded video sequence 203 is started. Accordingly, a change from a first initialization parameter set to a different second initialization parameter set may trigger the start of a new coded video sequence (CVS) 203.

In open GOP switching, however, the situation may be different. A switch at a predetermined switching point (e.g. at an (I)RAP NAL unit) may not start a new coded video sequence 203. In other words, in open GOP switching, a coded video sequence 203 may continue even when a switch between two bitstreams 211, 212 happens. Accordingly, the initialization parameter set 204 does not necessarily change at a switching point. Accordingly, the initialization parameter set 204 that is referred to by the pictures 10 of the first (switch-from) stream or track must comply with initialization parameters being referred to by the pictures of the second (switch-to) stream or track.

In other words, the initialization parameter set 204 used for initializing the decoding behavior of the decoder for correctly decoding the pictures 10 of the first (switch-from) bitstream or track must also be valid for initializing the decoding behavior of the decoder for correctly decoding the pictures 10 of the second (switch-to) bitstream or track. Stated in yet other words, the initialization parameter set 204 with which the decoder was initially initialized (which will in most cases be the initialization parameter set 204 associated with the first, i.e. initial, bitstream or track) has to enable the decoder for decoding the first (switch-from) bitstream or track and the second (switch-to) bitstream or track. If this requirement is not fulfilled, then the decoder may not be able to correctly decode the second (switch-to) bitstream or track. Again, this situation may particularly occur in open GOP switching since a switch from one bitstream or track to another bitstream or track may not start a new coded video sequence (CVS) 203.

This may lead to some problems, which are addressed by the concept of the present invention and which will be discussed in detail further below with reference to FIGS. 2 to 10. However, for further introductory purposes, reference will again be made to the embodiment as depicted in FIG. 1H.

The file generator 200, as depicted in FIG. 1H, may be configured to embed the at least two input video bitstreams 211, 212 into different tracks 220, 221, 222 of the video file 201. The tracks 220, 221, 222 can be switched among each other at the random access points (e.g. (I)RAP NAL units) of the respectively embedded input video bitstreams 211, 212.

The file generator 200 may be configured to provide in the video file 201, advantageously for each track 220, 221, 222, switching information 207 which indicates whether the different tracks 220, 221, 222 comprise one or more switch-to candidates for the respective track, i.e. information whether it can be switched from a current track (=switch-from track) to another track (=switch-to track).

The switching information 207 may further comprise information as to which of the different tracks 220, 221, 222 is/are such (a) potential switch-to candidate/s for the respective track. In other words, the switching information 207 may indicate if switching is possible/allowed, and if so, from which track (referred to as a "switch-from track") to which track (referred to as a "switch-to track") a switch can be made.

The file generator 200 may further be configured to provide in the video file 201, for each track, one or more initialization parameter sets (e.g. SPS and/or PPS and/or VPS) 204 which are to be inserted into a reconstructed bitstream and to be referenced by samples 231 thereof.

Said reconstructed bitstream (as will be explained in more detail in the following with reference to FIG. 1J) may comprise the input video bitstream that is embedded in the respective track (e.g. in case that no switch between tracks happened). Additionally or alternatively, in case of track-switching, the reconstructed bitstream may comprise a mixed video bitstream which results from switching between the input video bitstream that is embedded in the respective (switch-from) track and an input video bitstream that is embedded in the one or more switch-to candidates (i.e. switch-to tracks) for the respective (switch-from) track.

Figure 1J:
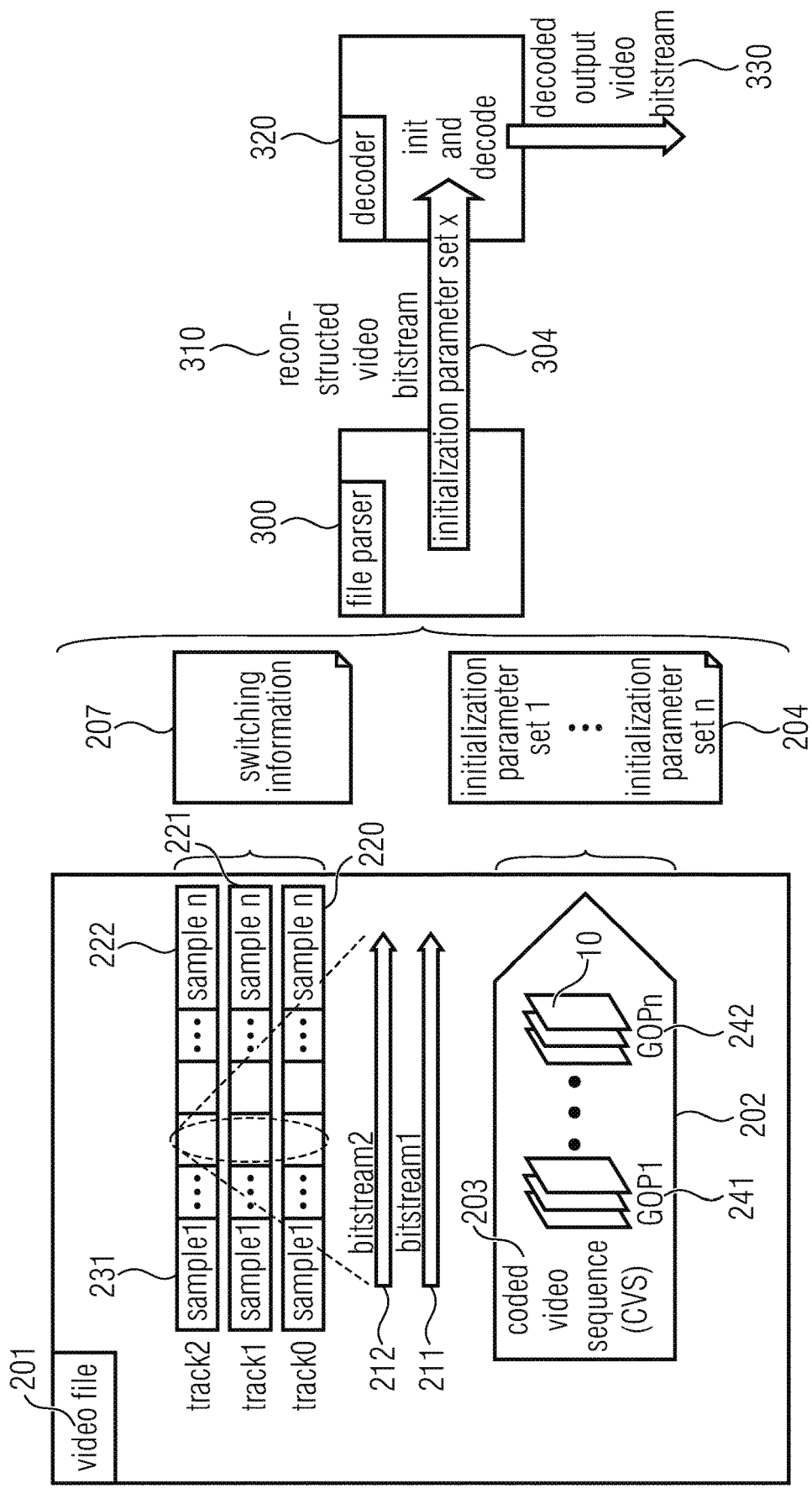

The so-constructed video file 201 may be conveyed to a file parser 300, which shall be explained now with reference to FIG. 1J. The file parser 300 is configured to receive the video file 201 that was generated by the file generator 200, as explained above. The file parser 300 is further configured to parse the tracks 220, 221, 222 contained in the video file 201 and to reconstruct a full bitstream therefrom. Accordingly, the file parser 300 may convey a reconstructed bitstream 310 to a decoder 320 for decoding the video content 202 contained in said reconstructed bitstream 310 and to create a decoded output video bitstream 330 being fed to a player device.

The reconstructed bitstream 310 may comprise a predetermined initialization parameter set 304, which enables the decoder 320 to correctly decode the entire video content 202. According to the present invention, the file parser 300 may be configured to select said predetermined initialization parameter set 304 based on one or more selection criteria (e.g. highest required decoding performance), and to feed said selected predetermined initialization parameter set 304 to the decoder 320.

Thus, according to an embodiment a file parser 310 is suggested for reconstructing a video bitstream 310 from a video file 201, wherein the video file 201 comprises different tracks 220, 221, 222 having at least two input video bitstreams 211, 212 embedded therein, wherein a video content 202 is coded differently (e.g. in different spatial resolutions) in said at least two input video bitstreams 211, 212, and wherein each input video bitstream 211, 212 comprises one or more coded video sequences (CVS) 203 with random access points.

The file parser 300 may be configured to retrieve, from the video file 201, switching information 207 related with one or more potential switch-from tracks 220, 221, 222 (or with a group of tracks—see sections 2.1 and 2.2 below), wherein said switching information 207 indicates whether the different tracks 220, 221, 222 comprise, and/or which of the different tracks 220, 221, 222 are, one or more switch-to candidates for a respective one of the tracks 220, 221, 222. For example, if a switch is envisaged from track 220 (as the switch-from track) to another track, then the switching information 207 may indicate whether one of the remaining tracks 221, 222 would be a switch-to candidate track to which it can be switched with re-using the predetermined initialization parameter set 304.

The file parser 300 may be configured to retrieve from the video file 201, one or more initialization parameter sets (e.g. SPS and/or PPS and/or VPS) 204 to be inserted into a reconstructed bitstream 310 and to be referenced by samples 231 thereof. For determining the predetermined initialization parameter set 304, the file parser 300 may be configured to select one of the initialization parameter sets 204 based on one or more selection criteria (e.g. max picture size in the CVS), as will be explained in more detail below. The selected initialization parameter set 204 may be chosen as the predetermined initialization parameter set 304 that is to be inserted into the reconstructed bitstream and with which the entire CVS 203 may be initialized.

Said reconstructed bitstream 310 may comprise (e.g. in case of no track-switching) the input video bitstream 211, 212 that is embedded in the respective track 220, 221, 222. Additionally or alternatively, the reconstructed bitstream 310 may comprise (e.g. in case of track-switching) a mixed video bitstream that results from switching between the input video bitstream 211, 212 that is embedded in the respective (switch-from) track e.g. 220 and that input video bitstream 211, 212 that is embedded in the one or more switch-to candidates e.g. 221, 222 of the respective (switch-from) track 220.

The file parser 300 may further be configured to provide the decoder 320 with the above mentioned predetermined initialization parameter set 304 retrieved from the video file 201 for a track of interest. A track of interest may be any track that shall be processed by the file parser 300, i.e. it can be a switch-from track, e.g. 220, but it can also be a switch-to track, e.g. 221, 222, in case of track-switching. In other words, a track of interest may be any track that is to be somehow processed by the file parser 300 and intended to be contained in the reconstructed video bitstream 310 being fed to the decoder 320. For example, if track-switching was not performed and the reconstructed video bitstream 310 comprises only one track, assume track 220, then the above mentioned predetermined initialization parameter set 304 may be one that is capable of processing track 220. In turn, if track-switching was performed, assume between tracks 220 and 222, then the above mentioned predetermined initialization parameter set 304 may be one that is capable of processing both tracks 220 and 222 with continuous re-use of the predetermined initialization parameter set 304, i.e. without having to read any other initialization parameter set after a switch.

The file parser 300 may further be configured to feed the decoder 320 (e.g. in case of no track-switching) with that input video bitstream 211, 212 that is embedded in the respective track 220, 221, 222. Accordingly, the reconstructed video bitstream 310 may comprise said input video bitstream 211, 212. Additionally or alternatively, the file parser 300 may be configured to feed the decoder 320 (e.g. in case of track-switching) with a mixed video bitstream resulting from switching between that input video bitstream 211, 212 that is embedded in the respective (switch-from) track, for instance track 222 and that input video bitstream 211, 212 that is embedded in the one or more switch-to candidates, for instance tracks 220 and 221 of the respective (switch-from) track 222. Accordingly, the reconstructed video bitstream 310 may comprise said mixed input video bitstream.

For example, it shall be switched from Track2 (222) to Track1 (221). In this non-limiting example, Track2 (222) may be referred to as the above mentioned respective (switch-from) track, while Track1 (221) may be referred to as one of the above mentioned switch-to candidates. For example, the second bitstream 212 may be embedded in Track2 (222), while the first bitstream 211 may be embedded in Track1 (221). A track switch from Track2 (222) to Track1 (221) would then result in a mixed video bitstream comprising a part of the first input video bitstream 211 and another part of the second input video bitstream 212. Accordingly, the reconstructed video bitstream 310 may then comprise said mixed video bitstream and may be fed by the file parser 300 to the decoder 320 for decoding. The file parser 300 may, as explained above, be configured to select the predetermined initialization parameter set 304 being conveyed together with the reconstructed bitstream 310 to the decoder 320 for initializing the decoder 320 and to enable the decoder 320 to correctly decode the reconstructed bitstream 310, which, in this non-limiting example, comprises said mixed bitstream resulting from track-switching.

As explained above with reference to FIG. 1H, said predetermined initialization parameter set 304 triggers the start of a coded video sequence 203. However, in open GOP switching, switching from one track to another track does not start a new CVS 203. Thus, the decoder has to be initialized at the very beginning with initialization parameters that allow to decode the entire reconstructed video bitstream 310 that may contain (in case of track switching) the above mentioned mixed video bitstream. Accordingly, the initialization parameters contained in the predetermined initialization parameter set 304 initially enables the decoder to decode the entire mixed video bitstream (with track switching) such that the decoder does not have to read any other initialization parameter set at a switching point (i.e. after a switch).

Accordingly, the predetermined initialization parameter set 304 comprises one or more initialization parameters being valid for the entire started coded video sequence 203 that is embedded in the aforementioned track of interest 220, 221, 222 (i.e. any track or tracks that are to be processed by the file parser 300 and fed to the decoder 320).

However, as mentioned above, particularly for track switching, or representation switching in DASH, some issues may arise if not tackled properly. In particular, VVC allows for open GOP resolution switching which is advantageous as a higher efficiency can be achieved compared to closed GOP encoding but a couple of issues need to be taken into account in an adaptive HTTP streaming environment.

These issues, which may arise in the known technology, shall be explained with reference to FIGS. 2 to 7. Subsequently, the inventive solution for these issues may be explained with reference to FIGS. 8 to 10. FIGS. 2 to 8 exemplarily show two different representations 401, 402. These two different representations 401, 402 may correspond to two different tracks within a file 201 or to two different versions of the same content offered for DASH. The term 'representation' may be used within this disclosure, in particular for streaming systems like DASH, while the term 'track' may be used herein, in particular for the file format.

Figure 2:
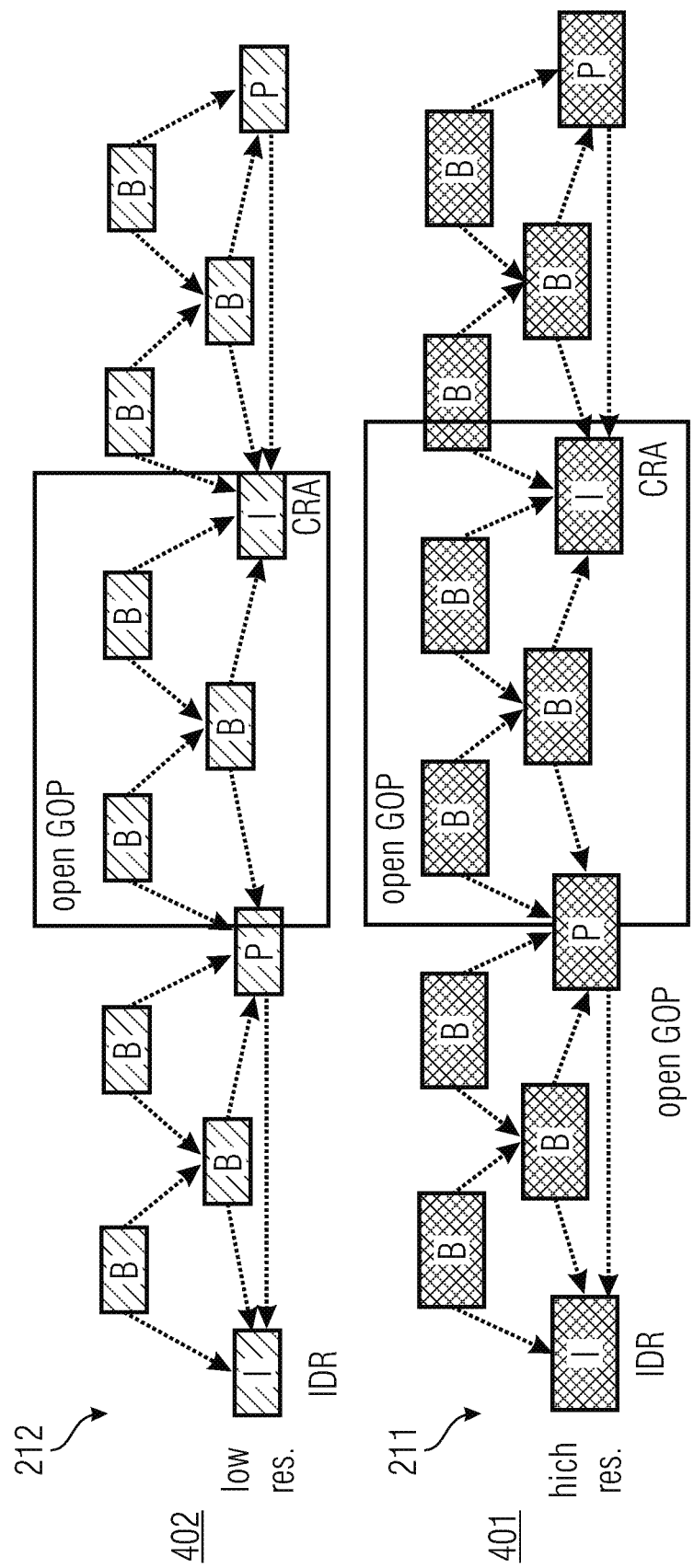
FIG. 2 shows an example of an open GOP bitstream comprising two bitstreams with different resolution.

For instance, in FIG. 2, two different representations 401, 402 of the same content are shown, one corresponding to high resolution content 401 and another corresponding to low resolution content 402. These two different representations 401, 402 could correspond to two different tracks within a file 201 or to two different versions of the same content offered for DASH. In any case, the goal is to be able to switch from one content to another, e.g. as shown in FIG. 3.

Figure 3:
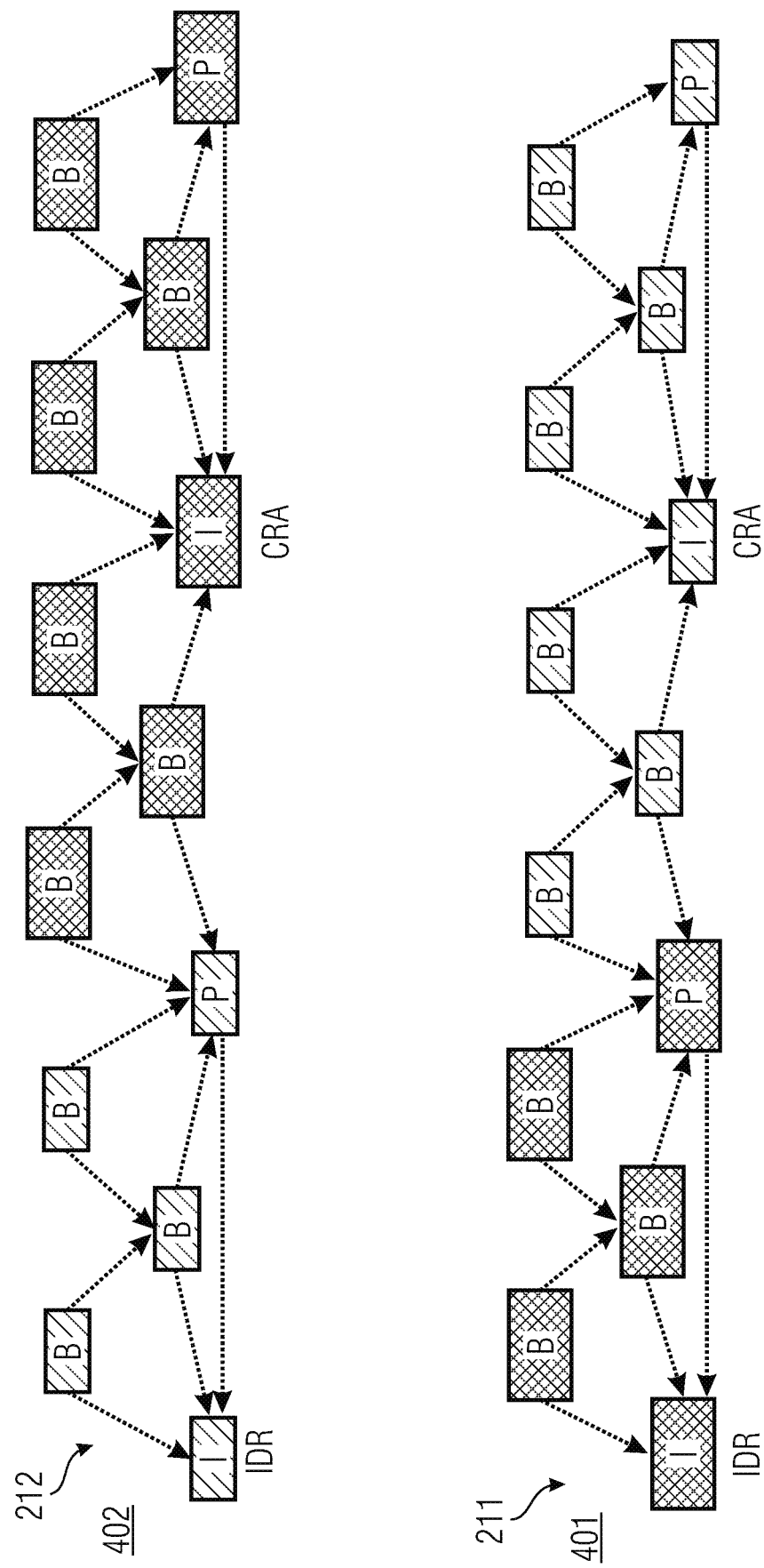
FIG. 3 shows an example of switching between segments from the two bitstreams of FIG. 1.

FIG. 3 shows a switching between segments from the two bitstreams 211, 212 of FIG. 2. The problem of such a scheme may arise with the integration of parameter sets. Different resolutions can be used for rate adaptation as an alternative to change the QP (Quantization Parameter) of encoding, e.g. as shown in FIG. 2. However, another purpose for offering different resolutions is the fact that there might be different client capabilities that need to be covered, e.g., in terms of which levels particular end-devices might support.

For instance, it may be assumed that the high resolution representation 401 in FIG. 2 may correspond to 4K and the low resolution representation 402 may correspond to 1080p. An initialization parameter set (e.g. an SPS) which is used for the low-resolution representation 402 would typically indicate level 4.0 or 4.1 (or whatever corresponds to 1080p at the particular frame rate and so on) so that decoders that conform to such a profile and level know that they can decode such a bitstream while the initialization parameter set (e.g. an SPS) being used for the high-resolution content 401 would typically indicate level 5.0 or 5.1 (or whatever corresponds to 4K at the particular frame rate and so on).

Open GOP switching with resolution change relies on Reference Picture Resampling (RPR). The idea is, that a sequence-related initialization parameter set (e.g. SPS) signals the maximum picture dimensions within a CVS and a respective picture-related initialization parameter set (e.g. PPS) would indicate the real picture dimension of each picture per Access Unit (AU). However, as discussed for the particular example of FIG. 2, the sequence-related initialization parameter set (e.g. SPS) would have to be different for level definition and maximum resolution and, thus, for clients that only can decode 1080p, the sequence-related initialization parameter set (e.g. SPS) needs to signal a level of e.g., 4.0 or 4.1 and a maximum picture size of 1080p.

Figure 4:
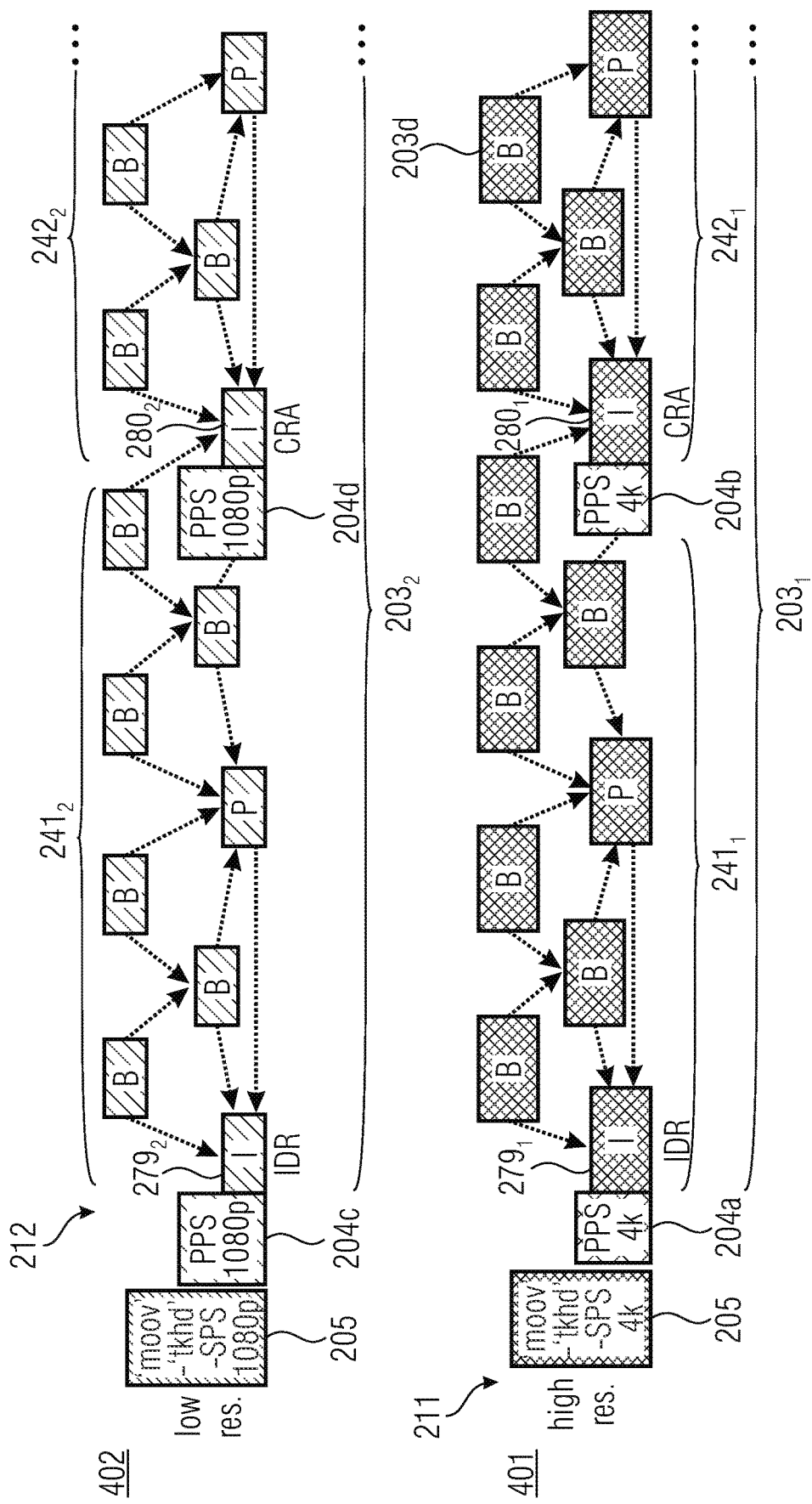
FIG. 4 shows an example of a sample entry storage of SPS and in-band PPS for the two bitstreams of FIG. 1.

So in case that the sequence-related initialization parameter sets (e.g. SPSs) are stored in a sample entry, the situation as depicted in FIG. 4 would apply.

FIG. 4 shows a state-of-the-art sample entry storage of SPS and in-band PPS for the two bitstreams of FIG. 2. It shows the first bitstream 211 comprising a first coded video sequence 203, comprising a first Group of Pictures (GOP) $241_1$ and a second GOP $242_1$. It further shows the second bitstream 212 comprising a second coded video sequence $203_2$ comprising a first Group of Pictures (GOP) $241_2$ and a second GOP $242_2$. The first GOPs $241_1$, $241_2$ may each comprise a random access point, in this particular non-limiting example an IDR picture $279_1$, $279_2$ (IDR: Instant Decoding Refresh). The second GOPs $242_1$, $242_2$ may each comprise a random access point, in this particular non-limiting example a CRA picture $280_1$, $280_2$ (CRA: Clean Random Access).

In case of open GOP switching, the GOPs may be switched from one bitstream 211, to another bitstream 212, at their respective random access points. In this example, at their respective CRA pictures $280_1$, $280_2$. As mentioned previously, open GOP switching does not start a new coded video sequence. Accordingly, if switched from one bitstream 211 to another bitstream 212 at their respective random access points (in an open GOP structure) the coded video sequence $203_1$, $203_2$ is continued even after the switch.

So, if the target end-device is not going to perform switching between the two different resolutions, the corresponding sample entry with the correct sequence parameter set (SPS) is provided. Otherwise, the proper parameter sets could be downloaded if switching is desired. That is, the correct sample entry from a different track header or a different movie box 'moov' for streaming is used. See the examples shown in FIG. 5.

Figure 5:
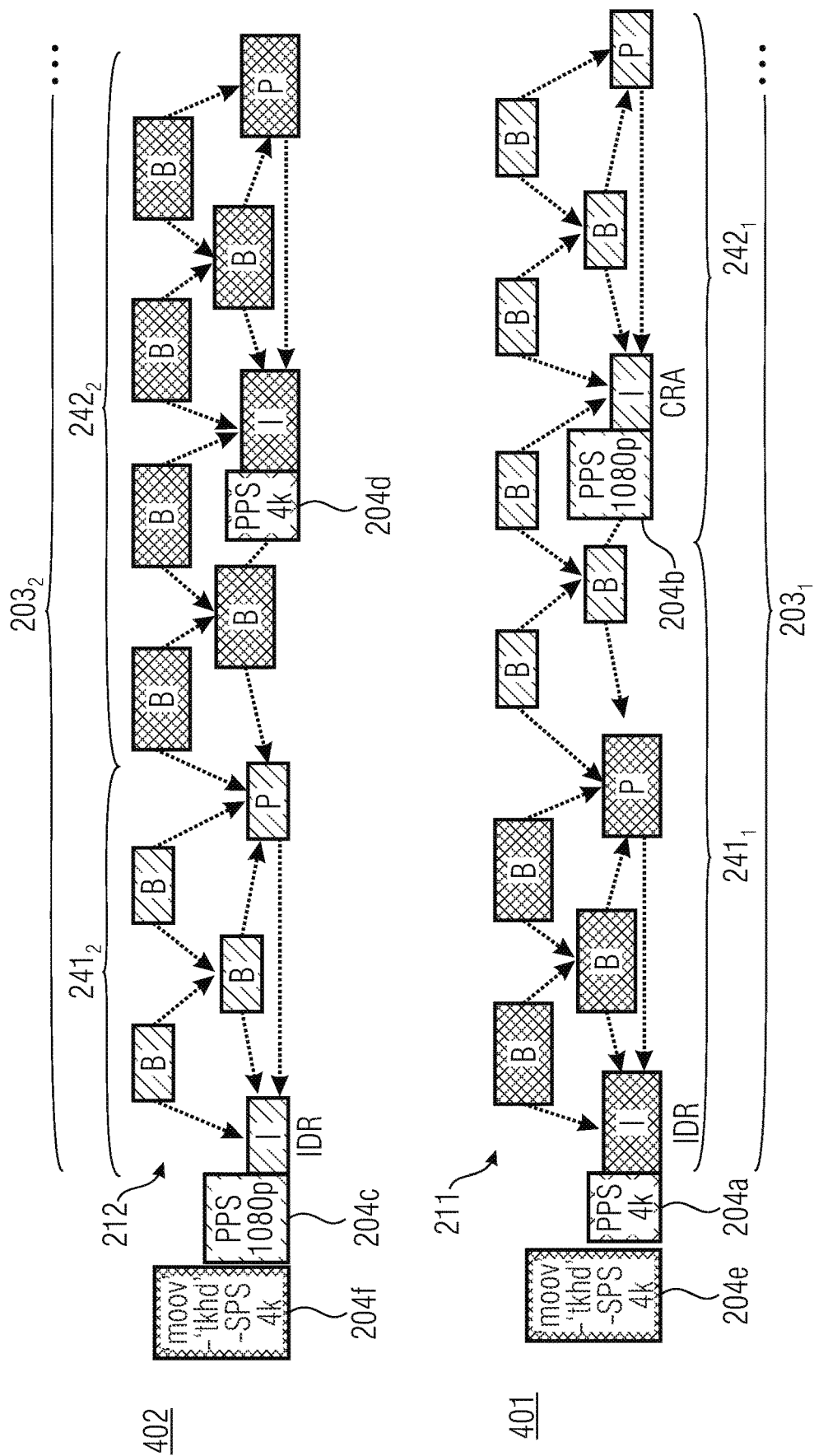
FIG. 5 shows an example of resulting bitstream variants when switching is to be performed.

FIG. 5 shows two resulting bitstream-variants when switching is performed. As can be seen, each representation 401, 402 is associated with one or more initialization parameter sets 204a, . . . , 204f. For example, a picture-related initialization parameter set (e.g. PPS) 204a, 204b, 204c, 204d may be associated with each GOP $241_1$, $242_1$, $241_2$, $242_2$. Additionally or alternatively, a sequence-related initialization parameter set (e.g. SPS) 204e, 204f may be associated with each coded video sequence (CVS) $203_1$, $203_2$.

As mentioned above, ISOBMFF allows storage of parameter sets 204a, . . . , 204f in two different ways. The first one comprises the so called out-of-band parameter set integration, which means that the parameter sets 204a, . . . , 204f are not stored together with the other non-VCL and VCL NAL units of the AUs (samples in terms of ISOBMFF) but in the sample entry of a track. Basically, the sample entry gives detailed information about the coding type used, and any initialization information needed for that coding. This information includes parameter sets 204.

A particular track may have several sample entries that apply to different parts of the bitstream. For instance, if a bitstream comprises two Coded Video Sequences (CVSs) that each refer to different SPS (with different content) with the same ID, two sample entries are used, in which SPS that have the same ID are stored. Samples within the track point to the proper sample entry that is used, either using the SampleToChunkBox 'stcs' or when the samples come in a fragmented track, e.g. when MPEG-DASH segments are used, the track fragment header of the track contained in e.g. the DASH segment ('tfhd') contain the sample_description_entry that points to which sample entry is used. Thus, the correct out-of-band parameters can be used for decoding the samples as identified by the proper sample description index.

However, there are use-cases in which it is not possible to store all parameter sets in the sample entry. Note that when a file is generated, the sample entry is stored in the 'moov' box which is typically at the beginning of the file. In particular, for live streaming, only the first used SPS 204e, 204f is/are known and can be stored at the 'moov' and further different SPS might appear later during playback while the service is running. Obviously, one option could be to perform some kind of constraint encode where the flexibility of parameter changes in the SPS is restricted and all potentially used SPS are generated beforehand and stored in the 'moov' box so that the respective sample entries can be referenced on-the-fly as required. But in other scenarios such a less flexible approach might not be desired and SPS might come within the samples as illustrated below in FIG. 6.

Figure 6:
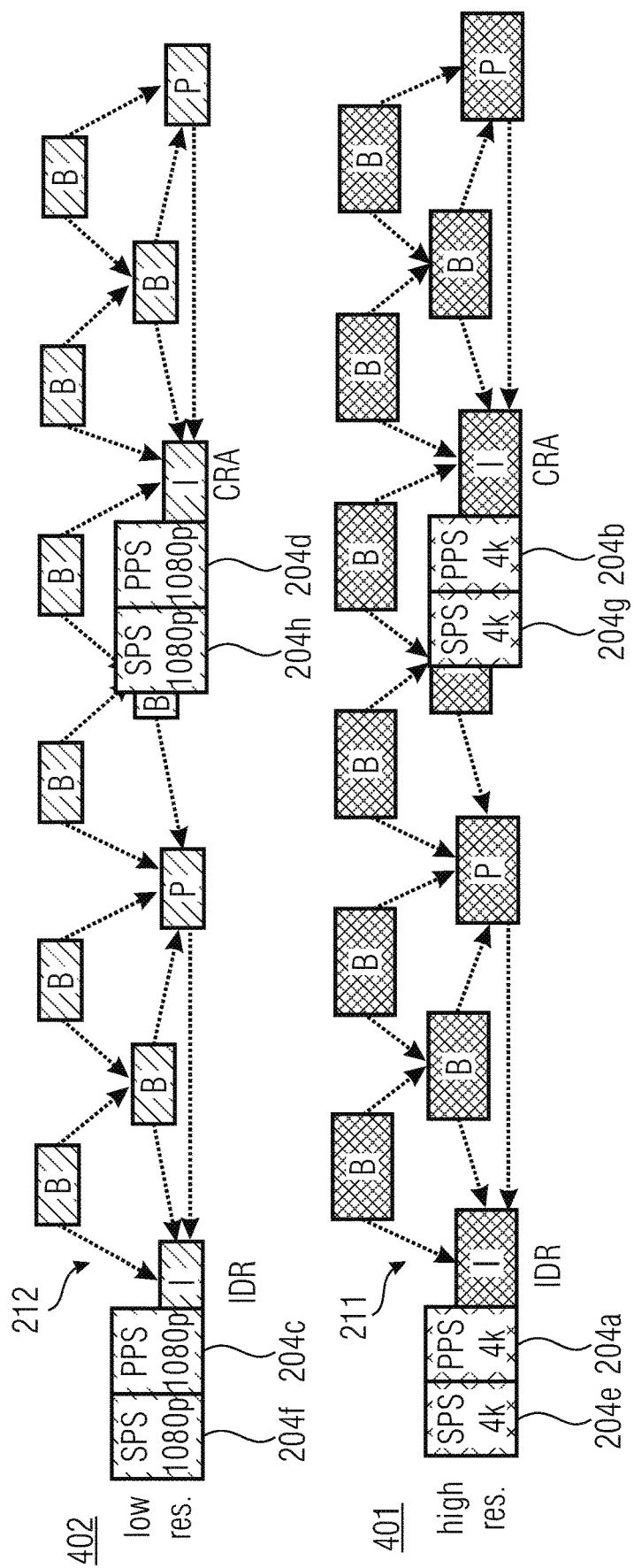
FIG. 6 shows an example of in-band storage of all parameter sets.

FIG. 6 shows the second alternative of storing initialization parameter sets 204a, . . . , 204h, namely the so-called in-band storage. In this case, initialization parameter sets 204a, . . . , 204h conveyed together with the samples as so-called in-band parameter sets and thus they are already present in the bitstream within the AUs as required.

Figure 7:
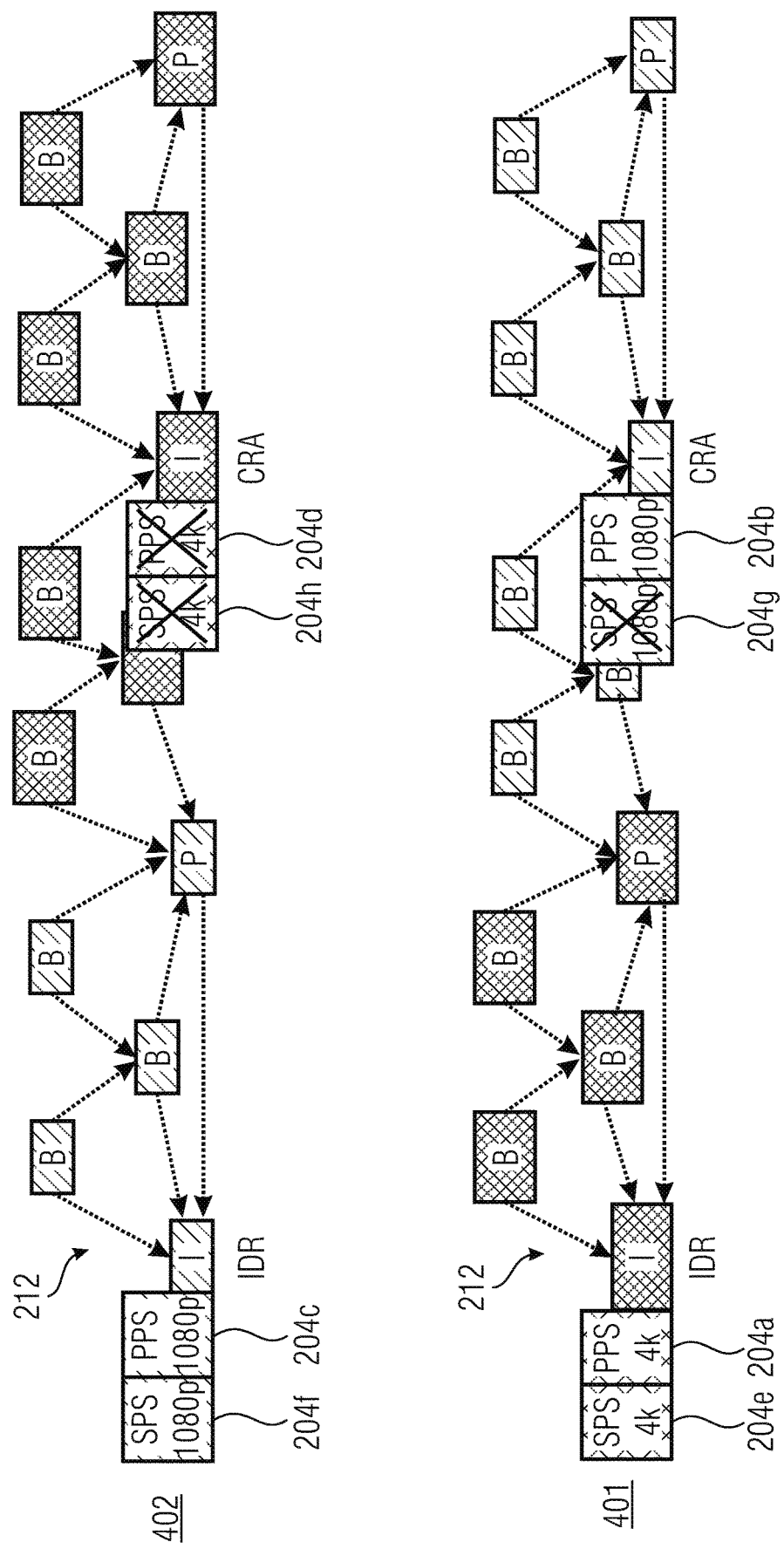
FIG. 7 shows an example of a non-conforming bitstream after switching with in-band SPS storage.

However, this results in the fact that, if nothing is done, switching following the principle from previous examples would lead to an erroneous bitstream as illustrated in FIG. 7.

FIG. 7 shows a scenario in which the first representation 401 is switched from high resolution (4 k) to low resolution (1080p) content. The sequence-related initialization parameter set 204e initially contained 4K-parameters. As mentioned above, open GOP switching does not start a new coded video sequence (CVS). Thus, the in-band conveyed sequence-related initialization parameter set 204g containing the low-resolution parameters for 1080p is not valid for this CVS. However, at least the in-band conveyed picture-related initialization parameter set 204b would be valid since it comprises the low-resolution parameters, i.e. pictures with low resolution (1080p) can be decoded since the decoder was initially initialized with the initialization parameter sets 204a, 204e of the high-resolution (4K) content. However, these two bitstreams are non-conformant and, thus, the resulting mixed bitstream after switching is erroneous.

Open GOP-switching in the above depicted second representation 402, i.e. when switching from low-resolution content (1080p) to high-resolution content (4K), is even worse. The sequence-related initialization parameter set 204f initially contained 1080p-parameters. As mentioned above, open GOP switching does not start a new coded video sequence (CVS). Thus, the in-band conveyed sequence-related initialization parameter set 204h containing the high-resolution parameters is not valid for this CVS. Additionally, also the in-band conveyed picture-related initialization parameter set 204d containing the high-resolution parameters is not valid for this CVS.

Again, it should be emphasized that open GOP switching with a CRA does not start a new CVS and therefore the SPS has to be exactly the same in a conforming bitstream. This means that the crossed-out SPSs 204g, 204h in FIG. 7 would be incorrect and the PPS 204d in the example above, when switching from low resolution to high resolution, would be invalid as it would signal picture sizes bigger than those signalled in the initial SPS at the beginning of the CVS.

2. Inventive Concept

Figure 8:
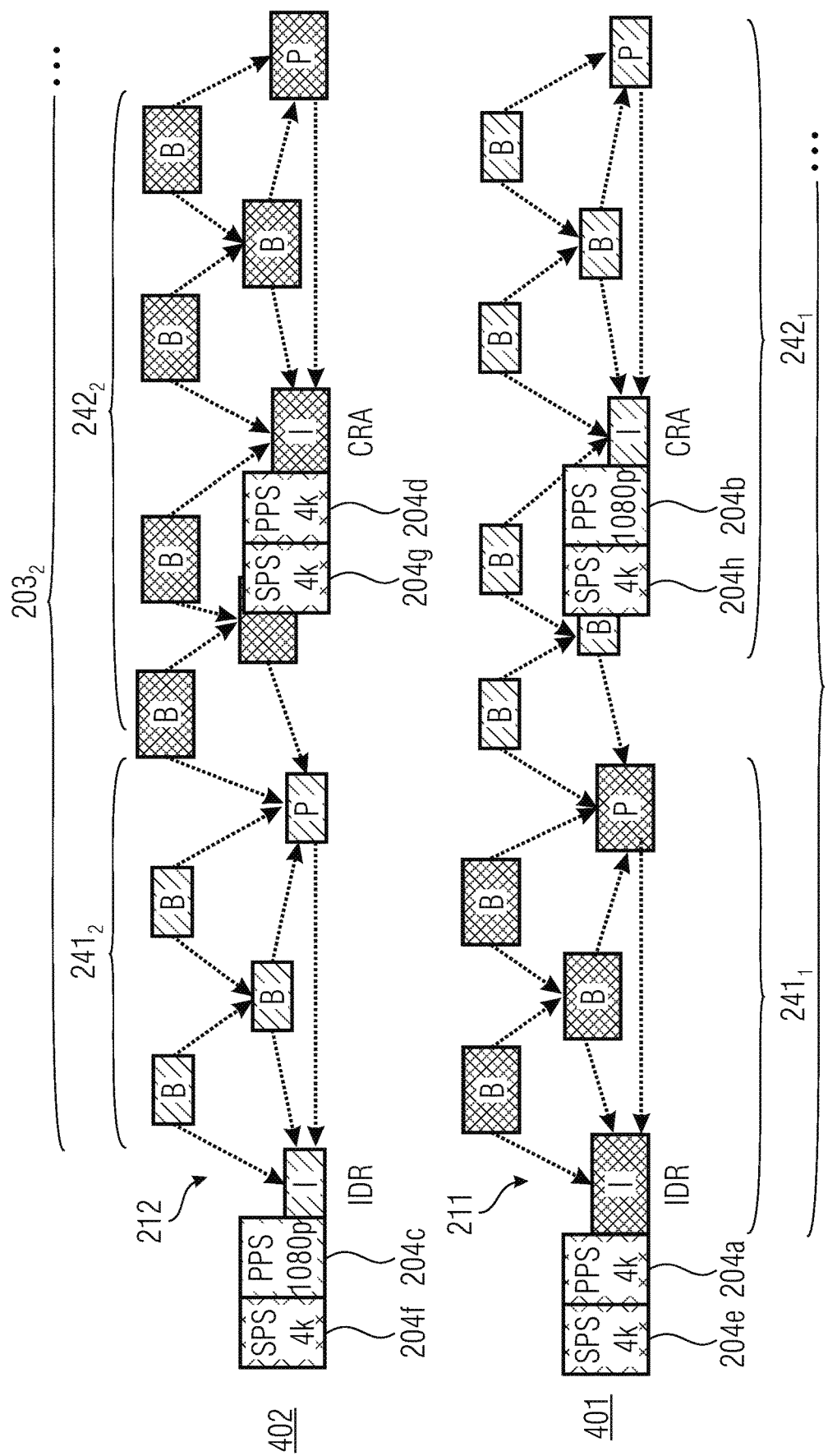
FIG. 8 shows a conforming bitstream after switching with in-band SPS storage according to an embodiment of the present invention.

In order to overcome the above-described issues, correct bitstreams with suitable parameter sets as shown in the example of FIG. 8 have to be derived by the client.

FIG. 8 shows conforming bitstreams 211, 212 after switching with in-band SPS storage. As can be seen, in particular in the above second representation 402, the decoder for decoding the CVS $203_2$ in the bitstream 212 is initialized with an initialization parameter set 204f that contains decoding parameter information for the high resolution content (4K) even though the bitstream 112 actually starts with low resolution content (1080p).

In other words, the one or more initialization parameter sets 204a, . . . , 204h are to be inserted into a reconstructed bitstream 310 and to be referenced by samples 231 thereof. The one or more initialization parameter sets 204a, . . . , 204h that are inserted into the reconstructed bitstream 310 are also referred to as predetermined initialization parameter set(s) 304 (c.f. FIG. 1J). As mentioned above, said predetermined initialization parameter set 304 triggers the start of a coded video sequence (CVS) 203, and it comprises one or more initialization parameters for the entire started coded video sequence 203 embedded in a track of interest 220, 221, 222. Again, since open GOP switching does not start a new CVS 203, the predetermined initialization parameter set 304 has to be valid for the entire started CVS 203, even though the CVS 203 may comprise mixed bitstreams resulting from a (track- or representation) switch (c.f. bitstreams 211 and 212 in FIG. 8).

As mentioned above, the (predetermined) initialization parameter set 204, 304 contains decoding parameter information for decoding an entire CVS 203 (In the following, the initialization parameter set 204 and the predetermined initialization parameter set 304 will both be referred to as initialization parameter set). In particular, the initialization parameter set 204, 304 is related with one or more video content attributes of the video content 202 that is contained in the coded video sequence 203.

For example, said video content attributes comprise at least one of:
 a maximum codec profile,
 a maximum codec level,
 a maximum picture width of the pictures appearing in the started coded video sequence 203,
 a maximum picture height of the pictures appearing in the started coded video sequence 203,
 a maximum color format of the pictures appearing in the started coded video sequence 203,
 a maximum bit depth of the pictures appearing in the started coded video sequence 203, and
 a maximum number of picture slots in the decoded picture buffer (DBP).

Accordingly, one or more of the above mentioned video content attributes may be derived from the initialization parameter set 204, 304. As mentioned above, the file parser may select a predetermined initialization parameter set 304 that is to included in the reconstructed bitstream 310.

The inventive file parser 300 may be configured to select the predetermined initialization parameter set 304 based on
 one or more of the signaled video content attributes,
 one or more maximum decoder capabilities,
 one or more desired operation points, and
 one or more desired target display capabilities.

For example, the predetermined initialization parameter set 304 may be selected based on a highest required global decoding capability of the decoder for being able to decode, without re-initialization, an entire coded video sequence (CVS) $203_1$, $203_2$ even if track-switching is enabled.

With continued reference to FIG. 8, the inventive concept may provide a client with respective file format signalling that allows it to derive conforming bitstreams 211, 212 given the above scenarios. Two variants of this invention are summarized as follows:
 Signalling to identify groups of tracks from which/to which it can be switched and, if so, which sample entry from which track needs to be used
 Signalling for alternative parameter sets to be used if switching is desired (either of tracks or DASH segments) or a particular target picture size is envisioned.

2.1 Hierarchical Track Grouping for Sample Entry Selection

In this aspect of the invention, signalling is described that allows a client to identify the tracks that can be switched among when the sample entry of a particular track has been used for decoder initialization. I.e. in client operation, segments of tracks (starting at sample positions with a particular SAP (Stream Access Point) type allowing random access, typically open-GOP CRA) from such a set of tracks can be concatenated and form a valid bitstream to be played back/ fed to a decoder using the appropriate sample entry(s) for decoder initialization. Note that the sample description box ('stsd') associated with a track in the movie box ('moov') describes one or more set(s) of configuration parameters for the bitstream within the track. There are as many sample entries as sets of configuration parameters, e.g., when two different codecs are used for the bitstream within the track.

In other words, each of the different tracks 220, 221, 222 may be associated with an own sample description box. For each track 220, 221, 222, its respective initialization parameter set 204 may be conveyed out-of-band by means of a sample entry inside its respective own sample description box being associated with the respective track 220, 221, 222.

Accordingly, different tracks may have different sample description boxes associated. The invented signalling is characterized by expressing a switching hierarchy, i.e. a track is marked with information regarding which further tracks can be switched-to in playback without reading further sample description boxes. This information corresponds to the switching information 207 as discussed above with reference to FIGS. 1H and 1J. The switching information 207 further allows to identify those one or more (switch-to) tracks for which switching-to does not require decoder re-initialization, i.e. with the appropriate sample entry within the sample description boxes being signaled no further sample description box is needed. For example, the switching information 207 may indicate that tracks can be switched without requiring to use sample description boxes of the switch-to track at each switch as well as indicating that, for decoding samples of a track, the sample description box of another track can be used.

In some embodiments, the switching information 207 may comprise an indication for identifying track groups ('aaaa', 'bbbb') comprising one or more tracks 220, 221, 222 from which it can be switched, so-called switch-from tracks. A track group may also comprise one or more tracks 220, 221, 222 to which it can be switched, so-called switch-to tracks or switch-to candidates. The switching information 207 may further identify which initialization parameter set 204 of which track 220, 221, 222 is to be used as the predetermined initialization parameter set 304 for reconstructing the bitstream 310 at the start of the coded video sequence 203. In other words, the switching information may provide an indication whether the predetermined initialization parameter set can be further used after a switch.

The following syntax shows a possible implementation for a track group, in this example track group 'aaaa':

```
aligned(8) class TrackGroupBox extends Box('trgr') {
}
aligned(8) class TrackGroupTypeBox(unsigned int(32) track_group_type)
extends FullBox(track_group_type, version = 0, flags = 0)
{
   unsigned int(32) track_group_id
   if track_group_type == 'aaaa' {
        unsigned int(32) track_switch_hierarchy_id
      }
   }
``` track_group_type indicates the grouping type and shall be set to one of the following values, or a value registered, or a value from a derived specification or registration: [ ... ]
  'aaaa' indicates that this track belongs to a group of tracks with the same value of track_group_id and a player playing a track with a particular value A of track_switch_hierarchy_id can switch to playing another track (at particular samples being marked as switching points, e.g., random access points (RAPs) or stream access points (SAPs)) in the group of tracks with a value B of track_switch_hierarchy_id where B is smaller than or equal to A without reading a new sample entry or mandatory re-initializing the decoder.
track_switch_hierarchy_id indicates the track switch identifier.

Figure 9:
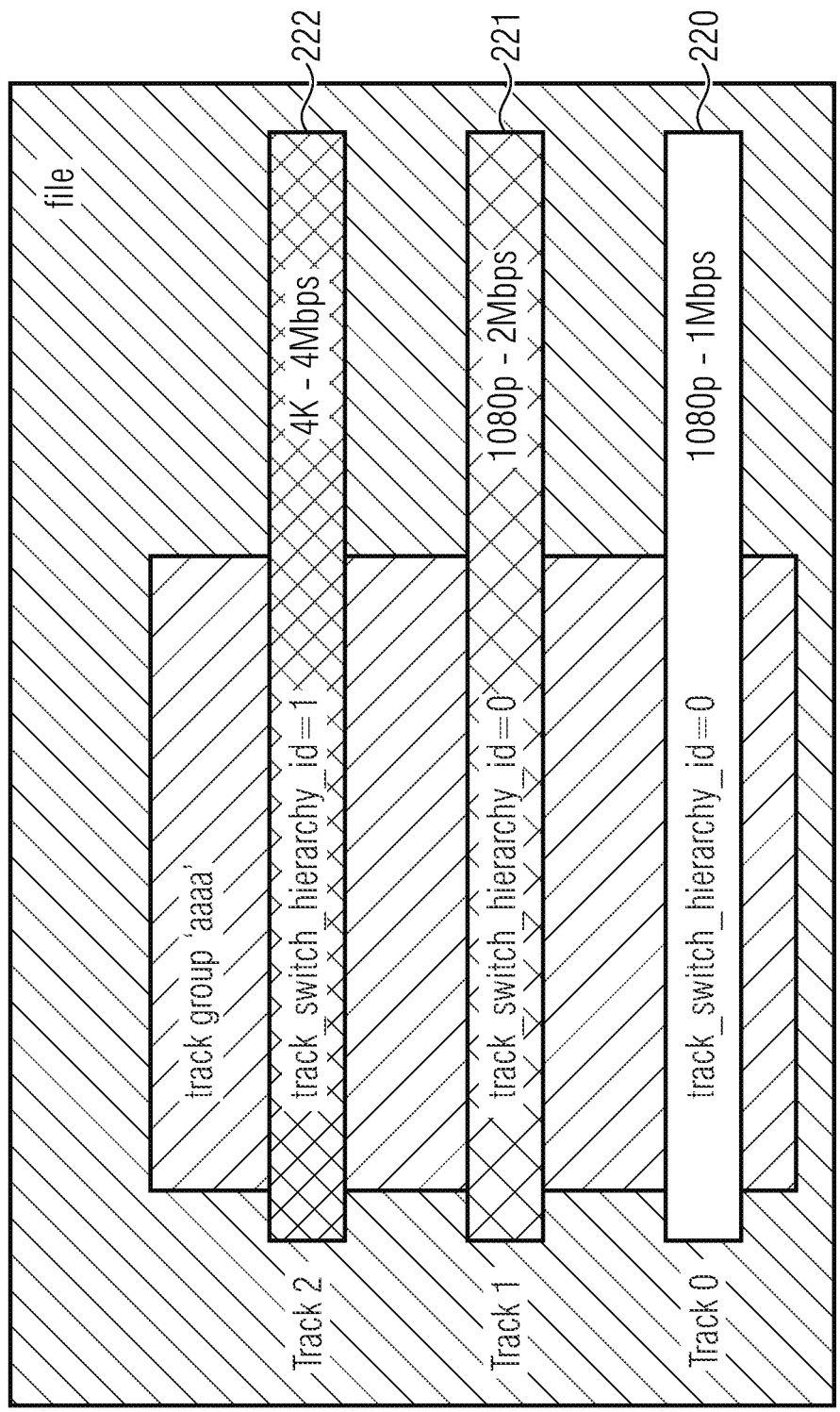
FIG. 9 shows the use of track groups with a switching hierarchy according to an embodiment of the present invention.
Figure 10:
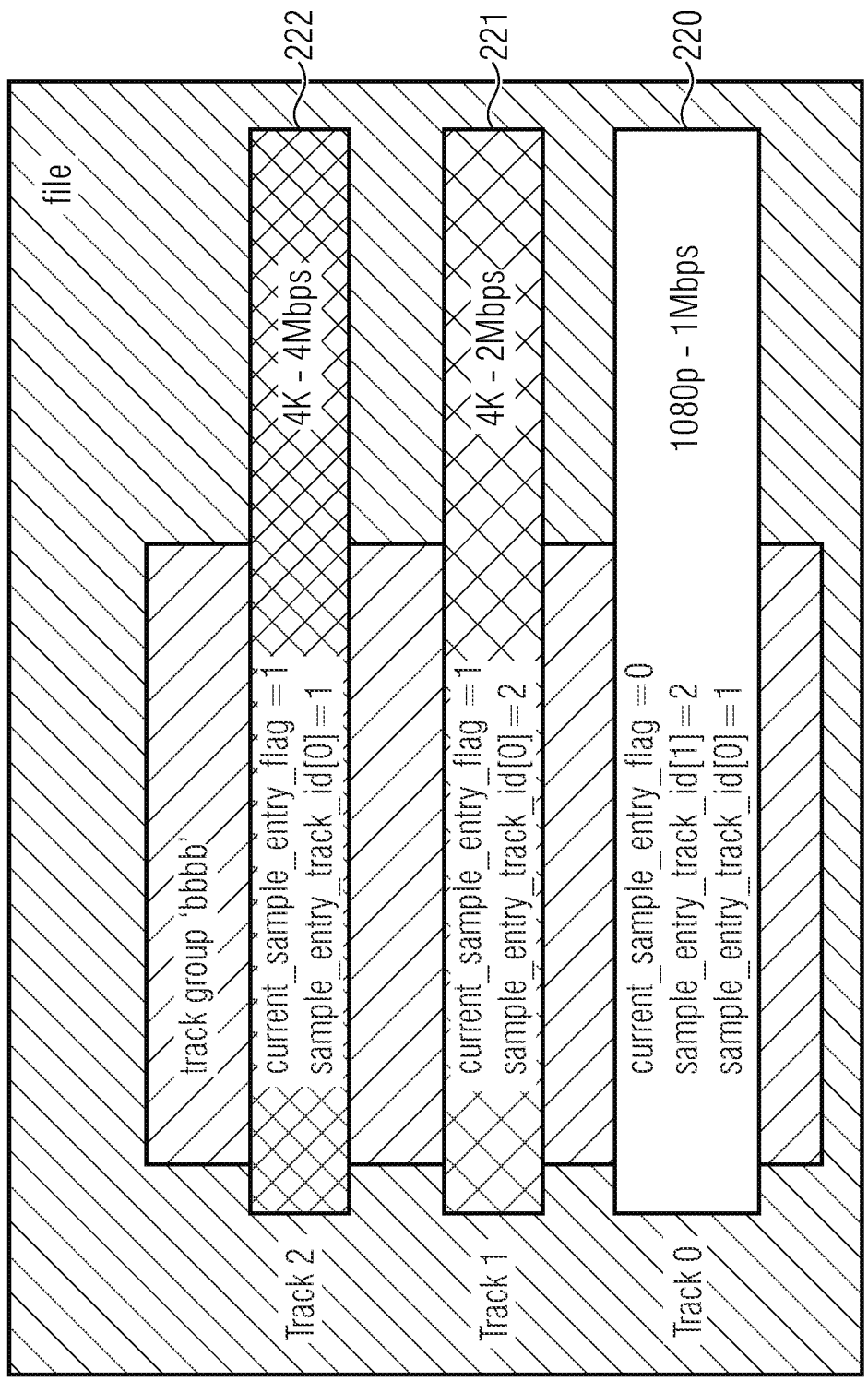
FIG. 10 shows the indication of additional/alternative initialization parameter sets (e.g. in sample entries) for initialization-less switching according to an embodiment of the present invention.

Along the lines of the example of FIG. 8, imagine two tracks 220, 221 hosting 1080p videos which would be marked by the above invented track group using track_switch_id value of 0 and one track 222 hosting the 4K video would be marked using a track_switch_id value of 1 as indicated in FIG. 9.

FIG. 9 shows an exemplary use of a track group with switching hierarchy. The 'aaaa' track group would indicate that only when the sample entry of the 4K video track 222 ('Track2') is used for initialization, a player can switch "down" to the 1080p video tracks 220, 221 ('Track0' and 'Track1') without re-initializing the decoder using the respective 1080p video track sample entry. Otherwise, a player would only be allowed to switch among the 1080p tracks 220, 221 ('Track0' and 'Track1').

Accordingly, the inventive file parser 300 may be configured to group the different tracks 220, 221, 222 into a track group 'aaaa' of a particular track group type (track_group_type). The file parser 300 may be configured to retrieve, for each track 220, 221, 222 of the track group 'aaaa', a track switching hierarchy ID (track_switch_hierarchy_id) indicating a switching hierarchy level of the respective track 220, 221, 222. This track switching hierarchy ID allows to identify whether a switch to a potential switch-to candidate 220, 221, 222 is allowed under continuing re-use of the predetermined initialization parameter set 304 that was initially used to reconstruct the bitstream (310) at the start of the coded video sequence (203).

With continued reference to FIG. 9, the track group may also indicate that the samples of the 1080p tracks 220, 221 ('Track0' and 'Track1') are decodable when the sample description box of the 4K track 222 ('Track2') was used but not the other way around. I.e., only sample description boxes from tracks with a higher track_switch_hierarchy_id can be used to decode samples of a particular track belonging to this group. In other words, if an initialization parameter set of a sample description box from a track with a first track_switch_hierarchy_id (e.g. track 222 having track_switch_hierarchy_id=1) was used to start the CVS 203, then it can be switched to tracks with a smaller second track_switch_hierarchy_id (e.g. tracks 220, 221 having track_switch_hierarchy_id=0).

Stated in yet other words, if the bitstream 310 was reconstructed at the start of the coded video sequence 203 by using the predetermined initialization parameter set 304 belonging to a predetermined track (e.g. the 4K-track 222) of the track group 'aaaa', and if said predetermined track 222 comprises a predetermined track switching hierarchy ID (e.g. track_switch_hierarchy_ID=1) indicating a predetermined switching hierarchy level, then a switch from any switch-from track (e.g. from the 4K-track 222 of the track group 'aaaa' to any potential switch-to candidate (e.g. one of the 1080p-tracks 220, 221) of said track group 'aaaa' is allowed,
  A) if the respective switch-to candidate (e.g. one of the 1080p-tracks 220, 221) comprises a track switching hierarchy ID indicating a switching hierarchy level being smaller than said predetermined switching hierarchy level of said predetermined track (e.g. the 4K-track 222) that was used for initialization. In this example, the 1080p-tracks 220, 221 have a track_switch_hierarchy_ID=0 that is smaller than the hierarchy level of the 4K-track 222 having a track_switch_hierarchy_ID=1. Thus, if the CVS 203 was initialized with the initialization parameter set of the 4K-track 222, then it can be switched to any of the 'smaller' 1080p tracks 220, 221.
  B) if the respective switch-to candidate comprises a track switching hierarchy ID indicating a switching hierarchy level being the same as said predetermined switching hierarchy level of said predetermined track that was used for initialization. For example, if an initialization parameter set of one of the 1080p-tracks 220, 221 was used for initializing the CVS 203, then it can be switched between the 1080p-tracks 220, 221 (since they have the same track_switch_hierarchy_ID=0). In turn, if the initialization parameter set of the 4K-track 222 was used for initializing the CVS 203, then it can be switched from the 1080p-tracks 220, 221 to the 4K-track 222 (since the 4K-track 222 has the same track_switch_hierarchy_ID=1 that was used for initialization) or between different 4K-tracks, if available.

However, a switch from any switch-from track of the track group 'aaaa' to any potential switch-to candidate track of said track group 'aaaa' is disallowed,
  if the respective switch-to candidate comprises a track switching hierarchy ID indicating a switching hierarchy level being larger than said predetermined switching hierarchy level of said predetermined track that was used for initialization. For example, if an initialization parameter set of one of the 1080p-tracks 220, 221 (with track_switch_hierarchy_ID=0) was used for initializing the CVS 203, then it is not allowed to switch to the 'higher' 4K-track 222 (with track_switch_hierarchy_ID=1).

In other words, assisted by the provided signalling, a player may select the sample description box for decoder initialization that corresponds to its maximum decoder capabilities and/or intended maximum operation point due to various factors such as offered and available operation points, network bandwidth, power budget, computational processing budget, display capabilities and so on. Thereby, it would already find the proper parameter set that can be used for decoding a bitstream irrespective of whether switches happen, as long as the signalled hierarchy is followed.

Accordingly, the file parser 300 may be configured to select the predetermined initialization parameter set 304 based on
one or more of the signaled video content attributes,
one or more maximum decoder capabilities,
one or more desired operation points, and
one or more desired target display capabilities.

2.2 Hierarchical Entity Grouping for Sample Entry Selection

Alternatively, the switching signalling information is carried out in Entity groups and they point directly to the tracks among which it can be switched.

```
aligned(8) class SampleDescriptionSharingBox extends
EntityToGroupBox('xxxx',0,0)
{   for (i = 0; i < num_entities_in_group; i++)
        unsigned int track_switch_hierarchy_id[i];
}
```

This box would identify the track ID values of the num_entities_in_group that belong to the group as done by any EntityToGroupBox and for each of these entries a value ID would be given indicating tracks that contain sample description boxes hierarchically. I.e., as for the previous case with track groups, sample description boxes with higher IDs can be used for decoding the samples of a track that is given a particular hierarchy ID. And switches can be performed to any track with a lower ID than the one for the track which has been used to take the sample description box.

Thus, according to embodiments, the file parser 300 may be configured to retrieve an Entity Group (sample description sharing box) comprising references (track_IDs) to one or more tracks 220, 221, 222 that can be switched among each other under continuing re-use of the predetermined initialization parameter set 304 that was initially used to reconstruct the bitstream 310 at the start of the coded video sequence 203, i.e. without need for changing/using a different SPS triggering the start of a new CVS. Each track 220, 221, 222 belonging to the Entity Group may comprise a track switching hierarchy ID (track_switch_hierarchy_id) indicating a switching hierarchy level of the respective track 220, 221, 222.

If the bitstream 310 was reconstructed at the start of a coded video sequence 203 by using the predetermined initialization parameter set 304 of a predetermined track 222 belonging to the Entity Group, which predetermined track 222 comprises a predetermined track switching hierarchy ID (track_switch_hierarchy_id=1) indicating a predetermined switching hierarchy level, then a switch from any switch-from track 220, 221, 222 of the Entity Group to any potential switch-to candidate 220, 221, 222 of the Entity Group is allowed,
if the respective switch-to candidate 220, 221, 222 comprises a track switching hierarchy ID (track_switch_hierarchy_id=0) indicating a switching hierarchy level being the same as, or being smaller than, said predetermined switching hierarchy level of said predetermined track 222 that was used for initialization.

However, a switch from any switch-from track 220, 221 of the Entity Group to any potential switch-to candidate 220, 221, 222 belonging to said Entity Group is disallowed,
if the respective switch-to candidate 222 comprises a track switching hierarchy ID (track_switch_hierarchy_id=1) indicating a switching hierarchy level being larger than said predetermined switching hierarchy level (track_switch_hierarchy_id=0) of said predetermined switch-from track 220, 221.

It should be noted that the track_switch_hierarchy_id[i] could also take the form of a simple boolean in a two-level hiercharchy of tracks: first set of tracks that, when used for decoder initalization (using the respective sample description box), allows switching and a second set of tracks that does not.

Thus, according to some embodiments, the track switching hierarchy ID (track_switch_hierarchy_id) may take the form of a boolean value indicating a two-level track switching hierarchy, wherein
a first set of tracks of the Entity Group comprises a first track switching hierarchy ID (track_switch_hierarchy_id=0) indicating a first level of said two-level track switching hierarchy, and
a second set of tracks of the Entity Group comprises a second track switching hierarchy ID (track_switch_hierarchy_id=1) indicating a different second level of a track switching hierarchy.

If the bitstream 310 was reconstructed at the start of the coded video sequence 203 by using a predetermined initialization parameter set 304 of a track from the first set of tracks, then switching to any other track of the Entity Group is allowed.

If the bitstream 310 was reconstructed at the start of the coded video sequence 203 by using a predetermined initialization parameter set of a track from the second set of tracks, then switching to any other track of the Entity Group is disallowed.

Another alternative is that the hierarchy is implicitly derived by the order in which the track IDs appear in the Entity Group. E.g. the first listed Track Id has the lowest hierarchy and the last listed Track Id hast the highest hierarchy.

Thus, in addition to or instead of the explicit signaling of said predetermined track switching hierarchy level by means of the above mentioned track switch hierarchy ID (track_switch_hierarchy_id), an implicit deriving is suggested.

For example, if a switch is performed from a first track 222 to a second track 220, the file parser 300 may implicitly derive a track switching hierarchy level (track_switch_hierarchy_id) from parameters included in the switch-from track 222 and/or the switch-to candidates 220, respectively.

Said parameters may comprise at least one of
a predetermined codec profile,
a predetermined codec level,
a predetermined picture width of the pictures appearing in the started coded video sequence,
a predetermined picture height of the pictures appearing in the started coded video sequence,
a predetermined color format of the pictures appearing in the started coded video sequence,
a predetermined bit depth of the pictures appearing in the started coded video sequence, and
a predetermined number of picture slots in the decoded picture buffer (DBP).

For example, if a first track 222 comprises a parameter (e.g. picture width) having a higher value than a corresponding parameter (e.g. picture width) comprised by a second track 220, then said first track 222 can have a higher switching hierarchy level than said second track 222. For instance, a higher picture size, a superset profile, a higher level, a bigger DPB, higher chroma format, higher bitdepth, etc. would lead to a higher hierarchy.

In some embodiments the references (track_id) to the tracks 220, 221, 222 belonging to the Entity Group are consecutively sorted in a predetermined order, as exemplarily depicted in FIG. 9. Here, the lowest 1080p track 220 has reference '0', i.e. track 220 is labeled 'Track 0' while the highest 4K track 222 has the highest reference '2', i.e. track 222 is labeled 'Track 2'.

In such embodiments, the switching hierarchy level (track_switch_hierarchy_id) of each track 220, 221, 222 may depend on the position of its reference (track_id) within said predetermined order.

For example, as exemplarily depicted in FIG. 9, a reference (track_id) to a track 220 ('Track 0') that appears first in said predetermined order may be associated with a predetermined track switching hierarchy ID (track_switch_hierarchy_id=0) indicating a lowest switching hierarchy level. In turn, a reference (track_id) to a track 222 ('Track 2') that appears last in said predetermined order may be associated with a different predetermined track switching hierarchy ID (track_switch_hierarchy_id=1) indicating a highest switching hierarchy level.

Of course, it can also be the other way around. That is, a reference (track_id) to a track that appears first in said predetermined order may be associated with a predetermined track switching hierarchy ID (track_switch_hierarchy_id=1) indicating a highest switching hierarchy level, and a reference (track_id) to a track that appears last in said predetermined order may be associated with a different predetermined track switching hierarchy ID (track_switch_hierarchy_id=0) indicating a lowest switching hierarchy level.

While the invention has been described on track level so far, the invention also concerns other system hierarchy levels, such as streaming the video content in streaming systems. Thus, further embodiments of the present invention concern client network devices 50 and server network devices 20, as described above with reference to FIGS. 1D and 1F. These client and server network devices 20, 50 are intended for transferring media content, using a streaming protocol, in streaming systems.

In streaming systems like DASH, signaling or constraints need to be set. For DASH, instead of tracks, there are representations. For instance, in FIGS. 2 to 8, two different representations 401, 402 are shown, each comprising one or more samples. As exemplarily depicted in FIGS. 4 and 5, each representation 401, 402 may be associated with an initialization segment 205 comprising one or more initialization parameter sets 204. For example, the initialization segments 205 of each representation 401, 402 may include (as the initialization parameter sets) the sample description boxes of the tracks within each representation 401, 402.

Each initialization parameter set 204 (e.g. each sample description box) may contain decoding parameter information to be inserted into a reconstructed bitstream 310 at the start of a coded video sequence 203 and to be referenced by samples thereof.

Similar to the above described track switching, the representations 401, 402 may be switched among each other, which may be referred to herein (e.g. in case of streaming systems like DASH) as representation switching. Similar to the initialization parameter sets 204, 304 described above, the initialization segments 205 can be used for representation switching. Accordingly, an inventive client network device 50 according to an embodiment may be configured to derive initialization segment information indicating that a predetermined initialization segment 205 of a predetermined representation 401 can be used for another representation 401. For example, said initialization segment information may indicate that the initialization segment 205 (e.g. the sample description box) of the first representation 401 can also be used for the second representation 402.

This means, upon representation switching, said predetermined Initialization Segment 205 of the first representation 401 may be selected and associated with the second representation 402. Accordingly, the decoding parameter information contained in said predetermined Initialization Segment 205 is to be inserted, at the beginning of a coded video sequence 203, into a reconstructed bitstream 310 that comprises samples contained in the first representation 401 and samples contained in the second representation 402. The above mentioned decoding parameter information is to be referenced by all samples, i.e. by the samples of the first representation 401 and by the samples of the second representation 402.

In order to select the correct initialization segment 205 that can be used for both representations 401, 402, the inventive client network device 50 may base its selection on different criteria. For example, the client network device 50 may be configured to select the predetermined initialization segment set 205 based on at least one of
maximum decoder capabilities,
a desired maximum operation point,
desired target display capability,
a maximum codec profile,
a maximum codec level,
a maximum picture width of the pictures appearing in the coded video sequence (203),
a maximum picture height of the pictures appearing in the coded video sequence (203),
a maximum color format of the pictures appearing in the coded video sequence (203),
a maximum bit depth of the pictures appearing in the stared coded video sequence (203), and
a maximum number of picture slots in the decoded picture buffer (DBP).

As mentioned above, the initialization segment information may indicate that a predetermined initialization segment 205 of the first representation 401 can also be used for the second representation 402. In some embodiments, a parameter may be added that indicates that using the initialization segment 205 (e.g. the sample description box) of another representation (e.g. of the first representation 41) is ok, i.e. the initialization segment 205 of a representation 401 can be used for another representation 402. Accordingly, the inventive client network device 50 may be configured to derive said initialization segment information from an additional parameter.

In some cases it is advantageous that the network client 50 already has the initialization segment information before downloading the media streams. Therefore, the initialization segment information may be transferred via a manifest file, wherein the manifest description may point to the respective initialization segment 205, e.g. to the initialization segment 205 of the first representation 401.

Or when representations are indicated as being switchable, e.g. belonging to the same AdaptationSet for a particular profile, it is implicitly signalled that the initialization segment of another representation can be used. Similar property could be indicated by cross Adaptation Set switching when this is allowed.

Thus, according to some embodiments, the client network device 50 may be configured to determine whether the representations 401, 402 belong to a predetermined set of Adaptation Sets, and whether a Cross Adaptation Set Switching between Adaptation Sets within said set of Adaptation Sets is allowed. This allows the client network device

50 to implicitly derive said initialization segment information, e.g. to implicitly derive that an initialization segment 205 of the first representation 401 can be used in the Adaptation Set of the second representation 402.

As mentioned above, representation switching may be possible, wherein different representations 401, 402 may be switched among each other. Therefore, the sample description boxes in each of the different initialization segments 205 may be constructed in such a way that they are aligned with the hierarchical system described above, i.e. it is known that initialization segments 205 of other representations 401, 402 can be used as long as a particular hierarchy is fulfilled as described above for tracks.

For example, if representations 401, 402 are indicated as being switchable, then the initialization segment information may comprise switching information for identifying one or more representations (e.g. the first representation 401) from which it can be switched, so-called switch-from representations, and one or more representations (e.g. the second representation 402) to which it can be switched, so-called switch-to representations or switch-to candidates. Said switching information may further identify which Initialization Segment 205 from which representation 401, 402 is to be used when switching from a switch-from representation 401 to a switch-to representation 402, i.e. it can be determined whether the selected predetermined Initialization Segment 205 can be further used at a switch or whether a new Initialization Segment is needed.

For example, let us assume that a switch is to be performed from the first representation 401 to the second representation 402, i.e. the first representation would be a switch-from representation and the second representation 402 would be a switch-to representation. Furthermore, let us assume that the sample description box 205 of the first representation 401 was used, i.e. the first representation 401 is also referred to as the predetermined representation whose initialization segment 205 (e.g. the sample description box) was used for initialization. In the same way as discussed above for tracks 220, 221, 222, each representation 401, 402 may be associated with a switching hierarchy level. The switching hierarchy level may identify whether a switch from a switch-from representation 401 to a potential switch-to representation 402 is allowed if the predetermined Initialization Segment 205 of the switch-from representation 401 was initially used, i.e. under continuing re-use of the initially selected predetermined Initialization Segment 205.

For example, switching from any switch-from representation 401 to any potential switch-to representation 402 is allowed if the switching hierarchy level of the switch-to representation 402 is the same, or is smaller than, the switching hierarchy level of the predetermined representation 401. Again, the predetermined representation is the one representation whose initialization segment 205 (e.g. the sample description box) was used for initialization. In this non-limiting example, we assume that a switch is performed from the first representation 401 to the second representation 402.

In turn, switching from any switch-from representation 401 to any potential switch-to representation 402 would be disallowed if the switching hierarchy level of the switch-to representation 402 is larger than the switching hierarchy level of the predetermined representation 401.

A further option would be that the hierarchy follows the levels indicated for a particular video, e.g. higher levels indicated as a mimeType codec parameters indicate a higher hierarchy. Accordingly, the switching hierarchy levels may follow the levels indicated for a particular video content 202, wherein higher levels for said video content 202, indicated as a mimeType codec parameter, may indicate a higher switching hierarchy level.

Another option would be to also consider the profile value, a profile that is a subset of another would have a lower hierarchy and a profile that is a superset of another would have a higher hierarchy. Accordingly, the switching hierarchy levels may follow the codec profile value, wherein a profile that is a subset of another profile has a lower hierarchy level, and wherein a profile that is a superset of another profile has a higher hierarchy level.

Similar to Section 2.1, assisted by the provided signalling, a player would select the sample description box for decoder initialization that corresponds to its maximum decoder capabilities and/or intended maximum operation point due to various factors such as offered and available operation points, network bandwidth, power budget, computational processing budget, display capabilities and so on.

2.3 Additional Sample Entries Track Grouping

Alternatively, additional sample entries to the ones in a particular track are referenced by means of a track group and when those additional sample entries are used for the initialization of the decoder, switching among tracks of the track group does not require decoder re-initialization.

```
aligned(8) class TrackGroupBox extends Box('trgr') {
}
aligned(8) class TrackGroupTypeBox(unsigned int(32) track_group_type)
extends FullBox(track_group_type, version = 0, flags = 0)
{
  unsigned int(32) track_group_id
  if track_group_type == 'bbbb' {
    boolean current_sample_entry_flag;
    unsigned int(8) num_sample_entry_track_ids;
    for (i = 0; i < num_track_group_IDs; i++){
      unsigned int(32) sample_entry_track_id[i]
    }
  }
}
``` track_group_type indicates the grouping type and shall be set to one of the following values, or a value registered, or a value from a derived specification or registration:

[ . . . ]

'bbbb' indicates that this track belongs to a group of tracks with the same value of track_group_id and a player can switch to playing any track in the group of tracks without re-initializing the decoder when being initialized with a sample entry of a track with an identifier equal to a value in sample_entry_track_id[ ] or the sample entry of the current track when current_sample_entry_flag is equal to 1.

current_sampe_entry_flag equal to 1 indicates that the sample entry of the current track is suitable to switch to any track of the current group of tracks without re-initialization.

num_sample_entry_track_ids indicates the number of track identifiers in the track group box.

sample_entry_track_id[i] indicates the i-th track identifier of the sample entry to be used for decoder initialization to allow a player to switch among tracks of the group of tracks without re-initialization.

FIG. 9 shows an example for indicating alternative sample entries for initialization-less switching with one 1080p track 220 and two 4K tracks 221, 222 where all tracks 220, 221, 222 are marked with the 'bbbb' sample group and respective settings of current_sample_entry_flag and sample_entry_track_id[i]. I.e. the 1080p track 220 is marked with current_sample_entry_flag=0 (1080p SPS is not sufficient for 4K playback) and sample_entry_track_id[0]=1, sample_entry_track_id[1]=2 (pointing to the sample entry of track 221 or track 222). The 4K tracks 221, 222 are marked with current_sample_entry_flag=1 (the 4K SPS allows 1080 playback as well) and a reference to the other 4K track 221, 222 respectively. In other words, selecting the sample entry of the current track played, only allows track switching when current_sample_entry_flag=1. It should be noted that for the case of current_sample_entry_flag=1, signalling of further sample_entry_track_id[ ] entries could be omitted for the sake of bitsavings.

Accordingly, some embodiments may provide for a file parser 300 being configured to retrieve for each track 220, 221, 222 of the track group 'bbbb' an indication (current_sample_entry_flag) for indicating whether track switching from a particular track 222 to any other potential switch-to candidate tracks 221, 220 inside said track group 'bbbb' is allowed under continuing re-use of the initialization parameter set 304 that was initially used to reconstruct the bitstream 310 at the start of the coded video sequence 203.

For example, if a particular track (e.g. track 222) has 'current_sample_entry_flag=1' it may signal that track-switching between any of the tracks 220, 221, 222 inside track group 'bbbb' is allowed if the reconstructed bitstream 304 was initialized with the initialization parameter set 304 of this particular track 222. In turn, if a particular track (e.g. track 220) has 'current_sample_entry_flag=0' it may signal that track-switching between any of the tracks 220, 221, 222 inside track group 'bbbb' is disallowed if the reconstructed bitstream 304 was initialized with the initialization parameter set 304 of this particular track 220.

In other words, the indication (current_sample_entry_flag) of the respective switch-from track (e.g. track 222) indicates whether switching from said respective switch-from track 222 to any other potential switch-to candidate tracks 220, 221 inside said track group 'bbbb' (under continuing re-use of that initialization parameter set 304 that was used to initially reconstruct the bitstream 310 at the start of the coded video sequence 203) is allowed, if the bitstream 310 was initially reconstructed at the start of the coded video sequence 203 by using the initialization parameter set 304 belonging to said respective switch-from track 222.

Additionally or alternatively, the file parser 300 may be configured to retrieve for each track 220, 221, 222 of the track group 'bbbb' an initialization parameter set list (sample_entry_track_id[ ]). For example, track 220 has an initialization parameter set list (sample_entry_track_id[ ]) comprising a first entry named 'sample_entry_track_id[0]=1' and a second entry named 'sample_entry_track_id[1]=2'. Said initialization parameter set list (sample_entry_track_id[ ]) explicitly points to those one or more switch-to tracks (e.g. 'sample_entry_track_id[0]=1' points to track 221 and 'sample_entry_track_id[1]=2' points to track 222), which are associated with an initialization parameter set 304 that allows track switching from said respective switch-from track (e.g. track 220) to any other potential switch-to candidates inside said track group 'bbbb' (e.g. to switch-to tracks 221, 222) in case the bitstream 310 was initially reconstructed at the start of the coded video sequence 203 by using one of the initialization parameter sets 304 of said one or more switch-to tracks (221, 222) contained in the initialization parameter set list (sample_entry_track_id[ ]).

In other words, with reference to track 220, track switching from track 220 to any other track inside track group 'bbbb' is only allowed if the initialization parameter set 304 of 'Track 1' 221 was used (sample_entry_track_id[0]=1) or if the initialization parameter set 304 of 'Track 2' 222 was used (sample_entry_track_id[1]=2) for initially reconstructing the bitstream 310 at the start of the CVS 203.

Similar to Section 2.1, assisted by the provided signalling, a player would select the sample description box for decoder initialization that corresponds to its maximum decoder capabilities and/or intended maximum operation point due to various factors such as offered and available operation points, network bandwidth, power budget, computational processing budget, display capabilities and so on.

All aspects described from 2.1 to 2.3 rely on an indication of a hierarchy among tracks. In a further embodiment, such hierarchy might be simply derived from parameters included in the tracks. For instance, a higher picture size, a superset profile, a higher level, a bigger DPB, higher chroma format, higher bitdepth would lead to a higher hierarchy. Therefore, simply a group of switchable tracks could be signalled either by using a track group mechanism or entity groups, indicating that re-use of sample description boxes of different tracks can be done as described above among tracks belonging to such a group and the hierarchy is implied by the capabilities as described in this paragraph and not explicitly signalled.

2.4 Sample Grouping for Alternative In-Band Parameter Sets

The solutions described above, work for parameter sets being taken from a sample entry in the sample description box, so called out-of-band parameter sets. However, there are cases in which parameter sets need to be included into the track itself with the samples (see the above described issue with reference to FIG. 7) as so-called in-band parameter sets.

Therefore, in another alternative to overcome the mentioned issues regarding decoder initialization and needing to restart a CVS in case of switching at an Open GOP position also for in-band parameter sets, the sample grouping mechanism is extended to include a sample group for additional parameter sets in the samples of a track that are alternatives to the regular in-band parameter sets of the track A player selects the correct parameter set based on the picture dimensions, color format, bit depth and number of pictures slots in the DPB (Decoded Picture Buffer) as indicated in the sample group entry. The parameter set within the sample (default for the particular track) needs to be exchanged with the selected alternative parameter set when the player initialized the decoder with parameters that correspond to the alternative parameters and wants to avoid decoder re-initialization.

For example, with reference to FIGS. 7 and 8, the first representation (i.e. track) 401 comprises a first GOP 241, and a second GOP 242, wherein parameter sets 204a, 204b, 204e, 204h are included in the track with the samples.

FIG. 7 shows an example in which the first representation (i.e. track) 401 is switched from high resolution (4 k) to low resolution (1080p) content. The sequence-related initialization parameter set 204e initially contained 4K-parameters. That is, the player initialized the decoder with 4 k-parameters that correspond to the 4 k initialization parameter set 204e.

The low resolution content, however, comprises by default an in-band conveyed initialization parameter set 204g that comprises 1080p-parameters and which is the default initialization parameter set. As mentioned above, open GOP switching does not start a new coded video sequence (CVS). Thus, the in-band conveyed sequence-related default initialization parameter set 204g containing the low-resolution parameters for 1080p is not valid for this CVS.

As mentioned above, the player initialized the decoder with the 4 k initialization parameter set 204e. Thus, said default 1080p initialization parameter set 204g has to be replaced by an additional or alternative initialization parameter set if a decoder re-initialization is to be avoided after the switch. In particular, the default 1080p initialization parameter set 204g has to be replaced by an additional or alternative initialization parameter set that is compatible with the initialization parameter set 204e with which the player initialized the decoder.

FIG. 8 shows such a scenario in which the default initialization parameter set 204g (FIG. 7) is replaced by an alternative initialization parameter set 204h. This alternative initialization parameter set 204h is compatible with the initialization parameter set 204h with which the player initialized the decoder. In this non-limiting example, the default 1080p initialization parameter set 204g (FIG. 7) was replaced by an alternative 4 k initialization parameter set 204h (FIG. 8). This alternative 4 k initialization parameter set 204g is compatible with the initialization parameter set 204e (that also contains 4 k parameters) with which the player initialized the decoder. As can be seen in FIGS. 7 and 8, the default initialization parameter set 204 g and the alternative initialization parameter set 204h are conveyed in-band within the samples.

According to some embodiments of the invention, samples for which default in-band initialization parameter sets may have to be replaced by alternative initialization parameter sets, as described above, can be grouped in sample groups. Each sample group may be associated with one or more initialization parameter sets to be inserted into a reconstructed bitstream and to be referenced by samples thereof. In other words, each sample group may comprise one or more alternative initialization parameter set that can replace any default initialization parameter sets.

The alternative initialization parameter sets may be associated with a certain predetermined or desired operation point and/or a maximum decoding capability of the decoder for decoding the entire coded video sequence (CVS). With continued reference to the example shown in FIG. 8, the 4 k content may represent a maximum operation point such that the 4 k parameters contained in the 4 k initialization parameter set 204h may enable the decoder to decode the entire CVS without re-initialization.

The desired operation point and/or the maximum decoding behavior of the decoder depends on at least one of the following attributes, wherein at least one of said attributes is indicated in the respective Sample Group:
  a maximum codec profile,
  a maximum codec level,
  a maximum picture width of the pictures contained in said one or more coded video sequences 203 to be decoded,
  a maximum picture height of the pictures contained in said one or more coded video sequences 203 to be decoded,
  a maximum bitdepth of the pictures contained in said one or more coded video sequences 203 to be decoded,
  a maximum color format of the pictures contained in said one or more coded video sequences 203 to be decoded, and
  a maximum size of a decoded picture buffer (DPB) for the pictures contained in said one or more coded video sequences 203 to be decoded.

As mentioned above, a sample group may contain a plurality of samples, and a sample group may be associated with one alternative initialization parameter set (e.g. initialization parameter set 204h). Additionally or alternatively, a sample group may be associated with more than one alternative initialization parameter sets, for instance any one of initialization parameter sets 204a, . . . , 204h. If a sample group is associated with more than one alternative initialization parameter set, then
  A) each of said more than one initialization parameter sets 204a, . . . , 204h may be associated with the same operation point, or
  B) each of said more than one initialization parameter sets 204a, . . . , 204h may be associated with at least one out of a plurality of operation points.

According to option A), each of said initialization parameter sets 204a, . . . , 204h may be associated with the same operation point. For example, each initialization parameter set 204a, . . . , 204h may comprise parameters for decoding a certain resolution, e.g. 4 k.

According to option B), each of said initialization parameter sets 204a, . . . , 204h may be associated with one or more operation points. For example, each initialization parameter set 204a, . . . , 204h may comprise parameters for decoding certain resolutions, e.g. 1080p, 4 k, 8 k.

In any case, the inventive file parser 301 may be configured to include, into the reconstructed bitstream 310, a predetermined initialization parameter set of a predetermined Sample Group, for example the 4 k parameter set 204h as exemplarily shown in FIG. 8. In other words, the inventive file parser 301 may be configured to replace a default in-band initialization parameter set 204g (FIG. 7) with a predetermined initialization parameter set 204h (FIG. 8) of a predetermined Sample Group.

For example, the 'pase' sample group and description box may be stored in the VisualSampleGroupEntry ( ).

```
class ParameterSetSamplegroup ( ) extends VisualSampleGroupEntry
('pase')
{
    unsigned int(16) max_width;
    unsigned int(16) max_height;
    unsigned int(16) max_bitdepth;
    unsigned int(16) max_color_format;
    unsigned int(16) max_dec_pic_buffering_minus1;
    unsigned int(16) paramSetNalUnitLength;
    bit(8* paramSetNalUnitLength) paramSetNalUnit;
}
```

The above parameters may also be stored in the SampleToGroupBox ( ) instead of the exemplarily mentioned VisualSampleGroupEntry ( ).

Therefore when the 'pase' sample description box is used to target a max decoding capability with at least one of max_widht, max_height, max_bitdepth, max_color_format and max_dec_pic_buffering_minus1+1 pictures, the parameter Set in the 'pase' sample group needs to be inserted into the bitstream and the original one needs to be removed.

This applies to the SPS in particular but could also apply to the VPS. Although a single box is shown above, one could use two different boxes one for SPS and one for the VPS or inherit respective properties from one parameter set to another (e.g. from VPS to SPS).

According to an embodiment, the 'pase' sample group may also be indicative of one or more operation points, e.g. through indicating output layer set indices and/or a highest temporal layer identifier.

In addition to the signalled characteristics further characteristics related to e.g. operation points could be also signalled, such as profile or level.

As mentioned above, the samples within a track may refer to a default in-band initialization parameter set 204g. A plurality of samples may be grouped together in a sample group. In this regard, one sample can be assigned to more than one sample group. The samples within a sample group may refer to one or more alternative initialization parameter sets 204h that may replace the default in-band initialization parameter set 204g.

Accordingly, if one or more samples within a track refer to a default in-band initialization parameter set 204g that is associated by default with said track, and if said one or more samples are marked as belonging to at least one of the sample groups, then the file parser 300 may be configured to derive an alternative initialization parameter set (e.g. the 4 k initialization parameter set 204h) being associated with the respective Sample Group. The file parser 300 may further be configured to replace the otherwise in-band transmitted initialization parameter set (e.g. the 1080p initialization parameter set 204g) by said alternative initialization parameter set 204h. This alternative initialization parameter set 204h of the Sample Group, may be provided as the predetermined (selected) initialization parameter set in-band, i.e. within the reconstructed bitstream 310 to the decoder.

If a track does not comprise any default in-band initialization parameter sets, then an alternative initialization parameter set (e.g. initialization parameter set 204h) can be selected from one of the sample groups to be inserted into the reconstructed bitstream 310.

Accordingly, if a track is not associated, by default, with any default in-band initialization parameter set, and if one or more of the samples which are contained in said track are marked as belonging to at least one of the one or more Sample Groups, then the inventive file parser 300 may be configured to insert a predetermined one (e.g. 204h) of the one or more initialization parameter sets which are associated with the at least one Sample Group into the reconstructed bitstream 310, and to provide said predetermined initialization parameter set 204h of the at least one Sample Group within the reconstructed bitstream 310 to the decoder.

It may be signaled for an entire track whether samples of said track may be associated with any default in-band initialization parameter set. Accordingly, an explicit signal may be provided that indicates that a track is not associated, by default, with any default in-band initialization parameter set. Additionally or alternatively, an explicit signal may be provided indicating that an initialization parameter set (e.g. the 4 k initialization parameter set 204h) for this track has to be selected from at least one of the available one or more Sample Groups, and that this selected initialization parameter set 204h has to be provided as the predetermined initialization parameter set to the decoder.

Additionally or alternatively, it may be signaled for individual samples of a sample group whether said samples may be associated with any default in-band initialization parameter set. Accordingly, an explicit signal may be provided indicating that those samples of a track, which are marked as belonging to one or more Sample Groups, do not refer, by default, to any default in-band initialization parameter set (e.g. to the 1080p initialization parameter set 204g). Additionally or alternatively, an explicit signal may be provided indicating that for those samples an initialization parameter set (e.g. the 4 k initialization parameter set 204h) from at least one of the available one or more Sample Groups, to which said those samples belong, has to be inserted into the reconstructed bitstream 310 and to be provided as the predetermined initialization parameter set to the decoder.

2.5 Additional Decoding Requirements Signalling

As pointed out above, sample description boxes might contain multiple sample entries. These may also reflect changes in underlying decoding process and might lead to decoder re-initialization at track switching which would be desirable to be avoided.

Note that VVC already contains a NAL unit referred to as Decoding capability information (DCI) which indicates conformance and capability requirements of a whole bitstream beyond the comprised individual coding video sequences. This means that if a decoder is able to decode the signalled levels and profiles (describing complexity of a bitstream), then the different CVSs within the bitstream with their individual complying level (lower or equal) and profile (subset or equal) are decodable without re-initialization. However, there are further aspects beyond profile and level that are controlled by the used SPS (e.g. bit depth and colour format) that might lead to problems and trigger a decoder re-initialization, e.g. when the DPB buffer management is not properly initialized to cope with varying picture formats in the bitstream.

For instance, imagine the DPB is initialized with 9 picture slots in a format of 8 bit and 4:2:0 at a particular resolution, and at some time instant the format changes, which is indicated in a new SPS (while still complying to the indicated profile and level in DCI), e.g. the format changes to 10 bit and 4:4:4 at the same resolution and the same number of picture slots. As the initial memory allocation does not suffice for the new format of the decoded pictures, the decoder would need to re-initialize (at least the DPB) and in some cases, it will lead to a latency, glitches, frame-gropping and non-continuous playout and decoding.

Therefore, additional information has to be signalled as to how to initialize the decoder in such situations and for a player to understand whether the decoder needs to be re-initialized at all.

In a first embodiment, the additional information on bit depth, colour format, resolution and number of picture slots is conveyed by means of an DCI extension as follows.

| | Descriptor |
|---|---|
| decoding_capability_information_rbsp( ) { | |
|   dci_reserved_zero_4bits | u(4) |
|   dci_num_ptls_minus1 | u(4) |
|   for( i = 0; i <= dci_num_ptls_minus1; i++ ) | |
|     profile_tier_level( 1, 0) | |
|   dci_extension_flag | u(1) |
|   if( dci_extension_flag ) { | |
|     dci_extension( ) | |
|     while( more_rbsp_data( ) ) | |
|       dci_extension_data_flag | u(1) |
|   } | |
|   rbsp_trailing_bits( ) | |
| } | |

| | Descriptor |
|---|---|
| dci_extension( ) { | |
|   dci_pic_width_max_in_luma_samples | ue(v) |
|   dci_pic_height_max_in_luma_samples | ue(v) |
|   dci_chroma_format_idc | u(2) |

-continued

| | Descriptor |
|---|---|
| dci_bitdepth_minus8 | ue(v) |
| dci_dpb_max_dec_pic_buffering_minus1 | ue(v) |
| } | |

The above DCI extension (dciextension( )) is a global bitstream-related decoding parameter information, i.e. the parameters contained therein are globally valid for the entire bitstream 310 instead of sequence related in case of an SPS, or picture-related in case of a PPS. The DCI extension may be signalled by means of a flag (dci_extension-flag).

Thus, according to some embodiments, a decoder 320 is provided for decoding pictures 10 of a video content 202 contained in an input video bitstream 310 (FIG. 1J). The pictures 10 are arranged in one or more consecutively arranged coded video sequences 203, each coded video sequence 203 being associated with its own sequence-related initialization parameter set (SPS) carrying sequence-related decoding parameter information.

The decoder 320 may be configured to initialize its decoding behavior, for decoding the pictures 10 of the video content 201, by using predetermined decoding parameter information prior to a start of decoding a coded video sequence 203. Therefore, the decoder 320 may be configured to derive a signal (dci_extension_flag), said signal indicating towards the decoder 320 to use for its initialization, instead of sequence-related decoding parameter information (SPS), the above mentioned global bitstream-related decoding parameter information (dci_extension ( )), which indicates a predetermined global decoding capability for all coded video sequences 203 contained in the entire input video bitstream 310.

Also a respective encoder 210 (FIG. 1H) is suggested, the encoder 210 being configured to provide predetermined decoding parameter information to be used by the above mentioned decoder 320 to initialize its decoding behavior, at a start of a coded video sequence 203, for decoding the pictures 10 contained in the coded video sequence 203. As mentioned above, each coded video sequence 203 may be associated with its own sequence-related initialization parameter set (SPS) carrying sequence-related decoding parameter information.

The encoder 210 may be configured to encode a signal (dci_extension_flag) into the bitstream 310, said signal indicating towards the decoder 320 to use for its initialization, instead of any sequence-related decoding parameter information, global bitstream-related decoding parameter information (dci_extension ( )), which indicates a predetermined global decoding capability for all coded video sequences 203 contained in the entire input video bitstream 310.

Said global bitstream-related decoding parameter information (dci_extension ( )) indicates the highest required global decoding capability of the decoder for being able to decode, without a re-initialization, all coded video sequences 203 inside the entire input video bitstream 310.

The following semantics are similar to those of the original SPS syntax elements besides the highlighted constraints.

dci_pic_width_max_in_luma_samples specifies the maximum width, in units of luma samples, of each decoded picture 10 referring to the SPS.

dci_pic_width_max_in_luma_samples shall not be equal to 0 and shall be an integer multiple of Max(8, MinCbSizeY).

Accordingly, said global bitstream-related decoding parameter information (dci_extension) comprises information about a maximum picture width (dci_pic_width_max_in_luma_samples), in units of luma samples, of pictures 10 that the decoder 320 is able to decode, without a re-initialization, if the decoder 320 was initially initialized with said global bitstream-related decoding parameter information (dci_extension ( )).

Sequence-related decoding parameter information (SPS) comprises information about a sequence-related maximum picture width (sps_pic_width_max_in_luma_samples), in units of luma samples, of those pictures 10 being contained in one particular coded video sequence 203.

Global bitstream-related decoding parameter information (dci_extension ( )), instead, comprises information about a global bitstream-related maximum picture width (dci_pic_width_max_in_luma_samples), in units of luma samples, of all pictures 10 contained in all coded video sequences 203 in the entire input video bitstream 310.

It is a requirement of bitstream conformance that no SPS referred to by a picture 10 in the bitstream 310 has a value of sps_pic_width_max_in_luma_samples larger than dci_pic_width_max_in_luma_samples.

That is, said global bitstream-related maximum picture width (dci_pic_width_max_in_luma_samples) is larger than, or equal to, any largest occurring sequence-related maximum picture width (sps_pic_width_max_in_luma_samples). dci_pic_height_max_in_luma_samples specifies the maximum height, in units of luma samples, of each decoded picture referring to the SPS. dci_pic_height_max_in_luma_samples shall not be equal to 0 and shall be an integer multiple of Max(8, MinCbSizeY).

Accordingly, said global bitstream-related decoding parameter information (dci_extension ( )) comprises information about a maximum picture height, in units of luma samples, of pictures 10 that the decoder 320 is able to decode, without a re-initialization, if the decoder 320 was initially initialized with said global bitstream-related decoding parameter information (dci_extension ( )).

Sequence-related decoding parameter information (SPS) comprises information about a sequence-related maximum picture height, in units of luma samples (sps_pic_height_max_in_luma_samples), of those pictures (10) being contained in one particular coded video sequence (203).

Global bitstream-related decoding parameter information (dci_extension ( )), instead, comprises information about a global bitstream-related maximum picture height (dci_pic_height_max_in_luma_samples), in units of luma samples, of all pictures 10 contained in all coded video sequences 203 in the entire input video bitstream 310.

It is a requirement of bitstream conformance that no SPS referred to by a picture 10 in the bitstream 310 has a value of sps_pic_height_max_in_luma_samples larger than dci_pic_height_max_in_luma_samples.

Accordingly, said global bitstream-related maximum picture height (dci_pic_height_max_in_luma_samples) is larger than, or equal to, any largest occurring sequence-related maximum picture height (sps_pic_height_max_in_luma_samples). dci_chroma_format_idc specifies the chroma sampling relative to the luma sampling as specified in subclause 6.2 of the VVC specification.

Accordingly, said global bitstream-related decoding parameter information (dci_extension ( )) comprises information about a maximum chroma format (dci_pic_chroma- _format_idc) of pictures 10 that the decoder 320 is able to decode, without a re-initialization, if the decoder 320 was initially initialized with said global bitstream-related decoding parameter information (dci_extension ( )).

Sequence-related decoding parameter information (SPS) comprises information about a sequence-related maximum chroma format (sps_chroma_format_idc) of those pictures 10 being contained in one particular coded video sequence 203.

Global bitstream-related decoding parameter information (dci_extension ( )), instead, comprises information about a global bitstream-related maximum chroma format (dci_chroma_format_idc) of all pictures 10 contained in all coded video sequences 203 in the entire input video bitstream 310.

It is a requirement of bitstream conformance that no SPS referred to by a picture 10 in the bitstream 310 has a value of sps_chroma_format_idc larger than dci_chroma_format_idc That is, said global bitstream-related maximum chroma format (dci_chroma_format_idc) is larger than, or equal to, any largest occurring sequence-related maximum chroma format (sps_chroma_format_idc).

Furthermore, the pictures 10 contained in one or more coded video sequences 203 refer to a video-related decoding parameter information (VPS) comprising information about a video-related maximum chroma format of the pictures 10 contained in the input video bitstream 310.

As mentioned above, the global bitstream-related decoding parameter information (dci_extension ( )) comprises information about a global bitstream-related maximum chroma format (dci_chroma_format_idc) of all pictures 10 contained in the entire input video bitstream 310.

It is a requirement of bitstream conformance that no VPS referred to by a picture 10 in the bitstream 310 has a value of vps_ols_dpb_chroma_format[i] larger than dci_chroma_format_idc for i in the range of 0 to NumMultiLayerOlss−1.

That is, said global bitstream-related maximum chroma format (dci_chroma_format_idc) is larger than, or equal to, any largest occurring video-related maximum chroma format (vps_ols_dpb_chroma_format) for none of the contained output layer sets.

dci_bitdepth_minus8 specifies the bit depth of the samples of the luma and chroma arrays in the VVC specification and the value of the luma and chroma quantization parameter range offset in the VVC specification. dci_bitdepth_minus8 shall be in the range of 0 to 2, inclusive.

Accordingly, said global bitstream-related decoding parameter information (dci_extension ( )) comprises information about a maximum bitdepth (dci_bitdepth_minus8) of pictures 10 that the decoder 320 is able to decode, without a re-initialization, if the decoder 320 was initially initialized with said global bitstream-related decoding parameter information (dci_extension ( )).

The sequence-related decoding parameter information (SPS) comprises information about a maximum bitdepth (dci_bitdepth_minus8) of those pictures 10 being contained in one particular coded video sequence 203.

The global bitstream-related decoding parameter information (dci_extension ( )), instead, comprises information about a global bitstream-related maximum bitdepth (dci_bitdepth_minus8) of all pictures 10 contained in all coded video sequences 203 in the entire input video bitstream 310.

It is a requirement of bitstream conformance that no SPS referred to by a picture 10 in the bitstream 310 has a value of sps_bitdepth_minus8 larger than dci_bitdepth_minus8.

That is, said global bitstream-related maximum bitdepth (dci_bitdepth_minus8) is larger than, or equal to, any largest occurring sequence-related maximum bitdepth (sps_bitdepth_minus8).

dci_dpb_max_dec_pic_buffering_minus1 plus 1 specifies the maximum required size of the DPB in units of picture storage buffers for decoding the bitstream. The value of dci_dpb_max_dec_pic_buffering_minus1 shall be in the range of 0 to MaxDpbSize−1, inclusive, where MaxDpbSize is as specified in clause A.4.2 of the VVC specification.

Accordingly, said global bitstream-related decoding parameter information (dci_extension ( )) comprises information about a required size of the decoded picture buffer (DPB), in units of picture storage buffers, (dci_dpb_max_dec_pic_buffering_minus1) for the decoder 320 to being able to decode the input video bitstream 310, without a re-initialization, if the decoder 320 was initially initialized with said global bitstream-related decoding parameter information (dci_extension ( )).

The sequence-related decoding parameter information (SPS) comprises information about a sequence-related maximum size of the decoded picture buffer (DPB), in units of picture storage buffers, (dpb_max_dec_pic_buffering_minus1) for those pictures 10 being contained in one particular coded video sequence 203.

The global bitstream-related decoding parameter information (dci_extension ( )), instead, comprises information about a global bitstream-related maximum size of a decoded picture buffer (DPB) (dci_dpb_max_dec_pic_buffering_minus1) for all pictures 10 contained all coded video sequences 203 in the entire input video bitstream 310.

It is a requirement of bitstream conformance that no SPS referred to by a picture 10 in the bitstream 310 has a value of dpb_max_dec_pic_buffering_minus1 [i] larger than dci_dpb_max_dec_pic_buffering_minus1 for any value of i in the range from 0 to MaxSubLayersMinus1.

That is, said global bitstream-related maximum size of the decoded picture buffer (DPB) (dci_dpb_max_dec_pic_buffering_minus1) is larger than, or equal to, any largest occurring sequence-related maximum size of the decoded picture buffer (DPB) (dpb_max_dec_pic_buffering_minus1).

In one embodiment, the global bitstream-related decoding parameter information (dci_extension ( )) may be signaled in a decoding capability information (DCI) NAL unit or in a Supplemental Enhancement Information (SEI) message.

Alternatively, these parameters can be indicated in a new bitstream DPB information (BDI) SEI message as follows with similar semantic constraints as above, respectively.

|  | Descriptor |
|---|---|
| bitstream_dpb_params( payloadSize ) { |  |
|   bdi_pic_width_max_in_luma_samples | ue(v) |
|   bdi_pic_height_max_in_luma_samples | ue(v) |
|   bdi_chroma_format_idc | u(2) |
|   bdi_bitdepth_minus8 | ue(v) |
|   bdi_dpb_max_dec_pic_buffering_minus1 | ue(v) |
| } |  |

Accordingly, the decoder 320 may be configured to derive the signal (dci_extension_flag) for signaling the use of the global bitstream-related decoding parameter information (dci_extension ( )) from the bitstream (310).

In another embodiment, instead of signalling the respective parameter values, a client/player is advised or used to allocate for the maximum value of the some or all items (particularly number of picture slots but also not excluding pic size, bit depth, color format) allowed in the spec for the decoders maximum capabilities in order to avoid re-initialization.

Accordingly, it is suggested to provide a player comprising a decoder 320 for decoding pictures 10 of a video content 202 contained in an input video bitstream 310, wherein the pictures 10 are arranged in one or more consecutively arranged coded video sequences (203), each coded video sequence (203) being associated with its own sequence-related initialization parameter set (SPS) carrying sequence-related decoding parameter information. As mentioned above, the decoder 310 may be configured to initialize its decoding behavior, for decoding the pictures 10 of the video content 202, by using at least one initialization parameter out of a predetermined set of initialization parameters (e.g. codec level, codec profile, picture width, picture height, bitdepth, color format, number of picture slots in DPB, and number of pictures) instead of using the signaled sequence-related decoding parameter information (SPS) prior to a start of decoding a particular coded video sequence 203.

According to such an embodiment, the player may be configured (e.g. advised or used) to allocate a maximum value (e.g. max_width, max_height, max_bitdepth, max_color_format, max_dec_pic_buffering_minus1, and numPics) of at least one parameter out of said set of initialization parameters for defining a minimum decoding requirement of the decoder 310 for being able to decode, without a re-initialization, all coded video sequences 203 inside the bitstream 310 which comply with these minimum decoding requirements.

Said set of initialization parameters, which defines the minimum decoding requirement of the decoder 320, comprises at least one of the following parameters which can be directly allocated by the player, instead of being derived from any signal in the file:
- a maximum codec profile,
- a maximum codec level,
- a maximum decoder capability,
- a desired operation point,
- a desired target display capability,
- a maximum picture width of the pictures 10 to be decoded,
- a maximum picture height of the pictures 10 to be decoded,
- a maximum color format of the pictures 10 to be decoded,
- a maximum bit depth of the pictures 10 to be decoded, and
- a maximum number of picture slots in the decoded picture buffer (DBP).

One exemplary means for the client/player to initialize the decoder in said way is by adapting/rewriting existing in-band or out-of-band parameter sets before using them for the reconstructed bitstream 310. Accordingly, the inventive player may be configured to initialize the decoder 320 in said way by adapting/rewriting existing in-band or out-of-band parameter sets before using them for the reconstructed bitstream 310. For example, the inventive player may be configured to initialize the decoder 320 in said way by adjusting one or more of the above listed parameters.

The client/player may adapt/rewrite the existing in-band or out-of-band parameter sets, and to initialize the decoder 320 thereby, e.g. by adjusting the indicated maximum picture width and height in an SPS according to the maximum decoder capabilities of the device and/or by adjusting the number of slots in the decoded picture buffer to the maximum of the respective specification and so on.

More concretely, e.g. if none of the syntax elements are signalled, then as discussed above the highest value for a particular level is inferred. However, if some other values are signalled, e.g. the maximum width and maximum height that are to be encountered in the bitstream 310, other missing syntax elements discussed above can be inferred, achieving for instance higher values than the default if the picture width and picture height are smaller than the maximum in a level.

As an alternative, such signalling could be carried within the file format, e.g., as a sample group. Accordingly, the above described decoder 320 may be configured to derive the signal (dci_extension_flag) for signaling the use of the global bitstream-related decoding parameter information (dci_extension ( )) from a file parser 300 within the file format by means of a Sample Group (DpbSamplegroup) to which one or more samples of a track (220, 221, 222 belong in which the pictures 10 of the input video bitstream 310 are embedded.

```
class DpbSamplegroup ( ) extends VisualSampleGroupEntry ('dpbs')
{
    unsigned int(16) max_width;
    unsigned int(16) max_height;
    unsigned int(16) max_bitdepth;
    unsigned int(16) max_color_format;
    unsigned int(16) max_dec_pic_buffering_minus1;
    unsigned int(16) numPics;
}
```

As can be seen, the above sample group DpbSamplegroup comprises a global bitstream-related decoding parameter information comprising a set of one or more global bitstream-related decoding parameters. Said global bitstream-related decoding parameter information indicates a predetermined, and in particular a maximum, global decoding capability for all coded video sequences 203 contained in the entire input video bitstream 310, e.g. max_width, max_height, max_bitdepth, max_color_format, max_dec_pic_buffering_minus1, and numPics.

In particular, the global bitstream-related decoding parameter information contains decoding capability information with respect to at least one of:
- a maximum codec profile,
- a maximum codec level,
- a maximum picture width of the pictures 10 to be decoded,
- a maximum picture height of the pictures 10 to be decoded,
- a maximum color format of the pictures 10 to be decoded,
- a maximum bit depth of the pictures 10 to be decoded, and
- a maximum number of picture slots in the decoded picture buffer (DBP)

of all coded video sequences 203 contained in the entire reconstructed video bitstream 310.

For example, if there is a single sample group of a track indicating the maximum picture size (width and/or height) and required number of slots (maximum slots), the decoder 320 can be initialized with such information.

The file parser 300 may be configured to select the decoding capability information based on
- one or more maximum decoder capabilities,
- one or more desired operation points, and
- one or more desired target display capabilities.

The file parser 300 may be configured to inform the decoder 320 to use for its initialization, instead of any sequence-related decoding parameter information, the above mentioned global bitstream-related decoding parameter information.

Summarizing, the inventive file parser 300 may be configured to reconstruct a video bitstream 310 from a video file 201, wherein the video file 201 comprises one or more tracks 220, 221, 222, each having one or more input video bitstreams 211, 212 embedded therein, wherein each of said one or more input video bitstreams 211, 212 comprises one or more coded video sequences 203. The file parser 300 may further be configured to retrieve from the video file 201 a Sample Group (DpbSamplegroup) to which one or more samples of said one or more tracks belong, wherein said sample group (DpbSamplegroup) contains a global bitstream-related decoding parameter information comprising a set of one or more global bitstream-related decoding parameters (e.g. codec level, codec profile, picture width, picture height, bitdepth, color format, number of picture slots in DPB, and number of pictures). The file parser 300 may further be configured (e.g. advised or used) to allocate a maximum value (e.g. max_width, max_height, max_bitdepth, max_color_format, max_dec_pic_buffering_minus1, and numPics) of at least one decoding parameter out of said set of decoding parameters (e.g. in the sample group) for defining a predetermined decoding capability of the decoder 320 for being able to decode, without a re-initialization, all coded video sequences 203 inside the bitstream 310 which comply with these predetermined decoding capabilities, instead of using any sequence-related decoding parameter information for initializing said predetermined decoding capabilities.

Embodiments of the present invention also provide file generator 200 (c.f. FIG. 1H) for generating a video file 201 from one or more input video bitstreams 211, 212, into which a video content is coded 202, wherein the video file 201 comprises one or more tracks 20, 221, 222) in which said one or more input video bitstreams 211, 212 are embedded, wherein each of said one or more input video bitstreams 211, 212 comprises one or more coded video sequences 203. The file generator 200 may be configured to provide, in the video file 201, a Sample Group (DpbSamplegroup) to which one or more samples of said one or more tracks belong, wherein said sample group (DpbSamplegroup) contains a global bitstream-related decoding parameter information comprising a set of one or more global bitstream-related decoding parameters (e.g. codec level, codec profile, picture width, picture height, bitdepth, color format, number of picture slots in DPB, and number of pictures). Said sample group (DpbSamplegroup) may further contain information about a maximum value (e.g. max_width, max_height, max_bitdepth, max_color_format, max_dec_pic_buffering_minus1, and numPics) of at least one decoding parameter out of said set of decoding parameters (in the sample group) for defining a predetermined decoding capability of a decoder 320 for being able to decode, without a re-initialization, all coded video sequences 203 inside the bitstream 310 which comply with these predetermined decoding capabilities, instead of using any sequence-related decoding parameter information for initializing said predetermined decoding capabilities.

The above discussed signalling could indicate that irrespective of whether there are more than one sample entry with different codec parameters for a particular track, given any sample in the track the indicated configuration (worst case) applies.

Further embodiments of this aspect concern a method for decoding pictures 10 of a video content 202 contained in an input video bitstream 310, the method comprising a step of initializing a decoding behavior of a decoder 320, for decoding the pictures 10 of the video content 202, by using predetermined decoding parameter information prior to a start of decoding a coded video sequence 203. The pictures 10 are arranged in one or more consecutively arranged coded video sequences 203, each coded video sequence 203 being associated with its own sequence-related initialization parameter set (SPS) carrying sequence-related decoding parameter information. The method further comprises a step of deriving a signal (dci_extension_flag) indicating to use, for the initialization of the decoding behavior of the decoder 320, instead of sequence-related decoding parameter information, global bitstream-related decoding parameter information (dci_extension), which indicates a predetermined global decoding capability for all coded video sequences 203 contained in the entire input video bitstream 310.

Further embodiments of this aspect concern a method for encoding pictures 10 of a video content 202 into a video bitstream 310, wherein the pictures 10 are arranged in one or more coded video sequences 203. The method comprises a step of providing predetermined decoding parameter information to be used by a decoder 320 to initialize its decoding behavior, at a start of a coded video sequence 203, for decoding the pictures 10 contained in said decoding video sequence 203. Each coded video sequence 203 is associated with its own sequence-related initialization parameter set (SPS) carrying sequence-related decoding parameter information. The method further comprises a step of encoding a signal (dci_extension_flag) into the bitstream 310, said signal indicating towards the decoder 320 to use for its initialization, instead of sequence-related decoding parameter information, global bitstream-related decoding parameter information (dci_extension), which indicates a predetermined global decoding capability for all coded video sequences 203 contained in the entire input video bitstream 310.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A processor implemented file parser for reconstructing a video bitstream from a video file, wherein the video file comprises different tracks comprising at least two input video bitstreams embedded therein, wherein a video content is coded differently in said at least two input video bitstreams, and wherein each input video bitstream comprises one or more coded video sequences with random access points, wherein the file parser is configured to
retrieve from the video file
switching information which indicates whether the different tracks comprise, and/or which of the different tracks are, one or more switch-to candidates for a respective track, and
one or more initialization parameter sets to be inserted into a reconstructed bitstream and to be referenced by samples thereof, wherein said reconstructed bitstream comprises either one of
the input video bitstream that is embedded in the respective track, and
a mixed video bitstream which results from switching between the input video bitstream that is embedded in the respective track and an input video bitstream that is embedded in the one or more switch-to candidates belonging to the respective track,
and wherein the file parser is further configured to
provide a decoder with a predetermined initialization parameter set retrieved from the video file for a track of interest and feed the decoder
with the input video bitstream that is embedded in the respective track, and/or
with a mixed video bitstream resulting from switching between the input video bitstream that is embedded in the respective track and the input video bitstream that is embedded in the one or more switch-to candidates belonging to the respective track,
wherein the file parser is further configured to retrieve an Entity Group comprising references to one or more tracks that can be switched among each other under continuing re-use of the predetermined initialization parameter set that was initially used to reconstruct the bitstream at the start of the coded video sequence,
wherein each track belonging to the Entity Group comprises a track switching hierarchy ID indicating a switching hierarchy level of the respective track, and wherein,
if the bitstream was reconstructed at the start of the coded video sequence by using the predetermined initialization parameter set of a predetermined track belonging to the Entity Group, which predetermined track comprises a predetermined track switching hierarchy ID indicating a predetermined switching hierarchy level,
then a switch from any switch-from track of the Entity Group to any potential switch-to candidate of the Entity Group is allowed,
if the respective switch-to candidate comprises a track switching hierarchy ID indicating a switching hierarchy level being the same as, or being smaller than, said predetermined switching hierarchy level of said predetermined track (used for initialization).

2. The file parser according to claim 1,
wherein the switching information comprises an implicit or explicit indication for indicating, for a switchable track, a track switching hierarchy of those tracks that can be switched among each other.

3. The file parser according to claim 1,
wherein each of the at least two input video bitstreams is coded with an open GOP structure comprising random access points at which a switch can be performed between the at least two input video bitstreams, and
wherein a coded video sequence of the video content is continued after a switch without starting a new coded video sequence.

4. The file parser according to claim 1,
wherein said predetermined initialization parameter set triggers the start of a coded video sequence and comprises one or more initialization parameters for the entire started coded video sequence embedded in said track of interest.

5. The file parser according to claim 1,
wherein the initialization parameter set signals one or more video content attributes of the video content comprised in said coded video sequence.

6. The file parser according to claim 5,
wherein said video content attributes comprise at least one of:
  a predetermined codec profile,
  a predetermined codec level,
  a predetermined picture width of the pictures appearing in the started coded video sequence,
  a predetermined picture height of the pictures appearing in the started coded video sequence,
  a predetermined color format of the pictures appearing in the started coded video sequence,
  a predetermined bit depth of the pictures appearing in the started coded video sequence, and
  a predetermined number of picture slots in the decoded picture buffer.

7. The file parser according to claim 5,
wherein said video content attributes comprise at least one of:
  a maximum codec profile,
  a maximum codec level,
  a maximum picture width of the pictures appearing in the started coded video sequence,
  a maximum picture height of the pictures appearing in the started coded video sequence,
  a maximum color format of the pictures appearing in the started coded video sequence,
  a maximum bit depth of the pictures appearing in the started coded video sequence, and
  a maximum number of picture slots in the decoded picture buffer.

8. The file parser according to claim 5,
configured to select the predetermined initialization parameter set based on
  one or more of the signaled video content attributes,
  one or more maximum decoder capabilities,
  one or more desired operation points, and
  one or more desired target display capabilities.

9. The file parser according to claim 1,
wherein said predetermined initialization parameter set triggers the start of a coded video sequence and comprises one or more initialization parameters for each picture being coded in the coded video sequence embedded in said track of interest, and
wherein the initialization parameter set signals, for each picture being coded in said coded video sequence, one or more of its real picture attributes.

10. The file parser according to claim 1,
wherein each of the different tracks is associated with an own sample description box, and
wherein, for each track, its respective initialization parameter set is conveyed out-of-band by means of a sample entry inside its respective own sample description box being associated with the respective track.

11. The file parser according to claim 1,
wherein the switching information comprises an indication for identifying groups of
  one or more tracks from which it can be switched, so-called switch-from tracks, and
  one or more tracks to which it can be switched, so-called switch-to tracks or switch-to candidates, and
wherein the switching information further identifies which initialization parameter set from which track is to be used for reconstructing the bitstream at the start of the coded video sequence.

12. The file parser according to claim 1,
configured to group the different tracks into a track group of a particular track group type, and
wherein the file parser is further configured to retrieve, for each track of the track group, a track switching hierarchy ID indicating a switching hierarchy level of the respective track, for identifying whether a switch to a potential switch-to candidate is allowed under continuing re-use of the predetermined initialization parameter set that was initially used to reconstruct the bitstream at the start of the coded video sequence.

13. The file parser according to claim 12, wherein
if the bitstream was reconstructed at the start of the coded video sequence by using the predetermined initialization parameter set belonging to a predetermined track of the track group, which predetermined track comprises a predetermined track switching hierarchy ID indicating a predetermined switching hierarchy level,
then a switch from any switch-from track of the track group to any potential switch-to candidate of said track group is allowed,
  if the respective switch-to candidate comprises a track switching hierarchy ID indicating a switching hierarchy level being the same as, or being smaller than, said predetermined switching hierarchy level of said predetermined track.

14. The file parser according to claim 12, wherein
if the bitstream was reconstructed at the start of the coded video sequence by using the predetermined initialization parameter set belonging to a predetermined track of the track group, which predetermined track comprises a predetermined track switching hierarchy ID indicating a predetermined switching hierarchy level,
then a switch from any switch-from track of the track group to any potential switch-to candidate of said track group is disallowed,
  if the respective switch-to candidate comprises a track switching hierarchy ID indicating a switching hierarchy level being larger than said predetermined switching hierarchy level of said predetermined track.

15. The file parser according to claim 12,
wherein the track switching hierarchy ID takes the form of a boolean value indicating a two-level track switching hierarchy, wherein
  a first set of tracks of the Entity Group comprises a first track switching hierarchy ID indicating a first level of said two-level track switching hierarchy, and a second set of tracks of the Entity Group comprises a second track switching hierarchy ID indicating a different second level of a track switching hierarchy, wherein
if the bitstream was reconstructed at the start of the coded video sequence by using a predetermined initialization parameter set of a track from the first set of tracks,
then switching to any other track of the Entity Group is allowed, and
if the bitstream was reconstructed at the start of the coded video sequence by using a predetermined initialization parameter set of a track from the second set of tracks,
then switching to any other track of the Entity Group is disallowed.

16. The file parser according to claim 12, wherein references to the tracks belonging to the Entity Group are consecutively sorted in a predetermined order,
wherein the switching hierarchy level of each track depends on the position of its reference within said predetermined order.

17. The file parser according to claim 16,
wherein a reference to a track that appears first in said predetermined order is associated with a predetermined track switching hierarchy ID indicating a lowest switching hierarchy level, and
wherein a reference to a track that appears last in said predetermined order is associated with a different predetermined track switching hierarchy ID indicating a highest switching hierarchy level.

18. The file parser according to claim 16,
wherein a reference to a track that appears first in said predetermined order is associated with a predetermined track switching hierarchy ID indicating a highest switching hierarchy level, and
wherein a reference to a track that appears last in said predetermined order is associated with a different predetermined track switching hierarchy ID indicating a lowest switching hierarchy level.

19. The file parser according to claim 1,
if the bitstream was reconstructed at the start of the coded video sequence by using the predetermined initialization parameter set of a predetermined track belonging to the Entity Group, which predetermined track comprises a predetermined track switching hierarchy ID indicating a predetermined switching hierarchy level,
then a switch from any switch-from track of the Entity Group to any potential switch-to candidate belonging to said Entity Group is disallowed,
if the respective switch-to candidate comprises a track switching hierarchy ID indicating a switching hierarchy level being larger than said predetermined switching hierarchy level of said predetermined switch-from track.

20. The file parser according to claim 1, wherein the file parser is configured to implicitly derive a track switching hierarchy level from parameters comprised in the switch-from track and/or in the switch-to candidates, respectively.

21. The file parser according to claim 20,
wherein said parameters comprise at least one of
a predetermined codec profile,
a predetermined codec level,
a predetermined picture width of the pictures appearing in the started coded video sequence,
a predetermined picture height of the pictures appearing in the started coded video sequence,.
a predetermined color format of the pictures appearing in the started coded video sequence,
· a predetermined bit depth of the pictures appearing in the started coded video sequence, and
a predetermined number of picture slots in the decoded picture buffer.

22. The file parser according to claim 20,
configured to implicitly derive the implicit track switching hierarchy level in such a way that
if a first track comprises a parameter comprising a higher value than a corresponding parameter comprised by a second track,
then said first track comprises a higher switching hierarchy level than said second track.

23. The file parser according to claim 1,
configured to
group the different tracks into a track group of a particular track group type, and
to retrieve for each track of the track group
an indication for indicating whether track switching from the respective track to any other potential switch-to candidates inside said track group is allowed under continuing re-use of that initialization parameter set that was initially used to reconstruct the bitstream at the start of the coded video sequence,
and/or an initialization parameter set list explicitly pointing to those one or more tracks, which are associated with an initialization parameter set that allows track switching from said respective switch-from track to any other potential switch-to candidates inside said track group in case the bitstream was initially reconstructed at the start of the coded video sequence by using one of the initialization parameter sets of said those one or more switch-to tracks comprised in the initialization parameter set list.

24. The file parser according to claim 23,
wherein the indication of the respective switch-from track indicates whether switching from said respective switch-from track to any other potential switch-to candidates inside said track group is allowed
if the bitstream was initially reconstructed at the start of the coded video sequence by using the initialization parameter set belonging to said respective switch-from track.

25. A client network device for retrieving, using a streaming protocol, a media content from a server,
wherein the client network device comprises a file parser according to claim 1.

26. A method for reconstructing a video bitstream from a video file, wherein the video file comprises different tracks comprising at least two input video bitstreams embedded therein, wherein a video content is coded differently in said at least two input video bitstreams, and wherein each input video bitstream comprises one or more coded video sequences with random access points,
wherein the method comprises
retrieving from the video file
switching information which indicates whether the different tracks comprise, and/or which of the different tracks are, one or more switch-to candidates for a respective track, and
one or more initialization parameter sets to be inserted into a reconstructed bitstream and to be referenced by samples thereof, wherein said reconstructed bitstream comprises either one of
the input video bitstream that is embedded in the respective track, and
a mixed video bitstream resulting from switching between the input video bitstream that is embedded in the respective track and an input video bitstream that is embedded in the one or more switch-to candidates belonging to the respective track, and wherein the method further comprises
providing a decoder with a predetermined initialization parameter set retrieved from the video file for a track of interest and feed the decoder with
the input video bitstream that is embedded in the respective track, and/or
with a mixed video bitstream resulting from switching between the input video bitstream that is embedded in the respective track and the input video bitstream that is embedded in the one or more switch-to candidates belonging to the respective track, wherein the method further comprises
retrieving an Entity Group comprising references to one or more tracks that can be switched among each other under continuing re-use of the predetermined initialization parameter set that was initially used to reconstruct the bitstream at the start of the coded video sequence, wherein each track belonging to the Entity Group comprises a track switching hierarchy ID indicating a switching hierarchy level of the respective track, and wherein,
if the bitstream was reconstructed at the start of the coded video sequence by using the predetermined initialization parameter set of a predetermined track belonging to the Entity Group, which predetermined track comprises a predetermined track switching hierarchy ID indicating a predetermined switching hierarchy level
then a switch from any switch-from track of the Entity Group to any potential switch-to candidate of the Entity Group is allowed, ∝ if the respective switch-to candidate comprises a track switching hierarchy ID indicating a switching hierarchy level being the same as, or being smaller than, said predetermined switching hierarchy level of said predetermined track (used for initialization).

* * * * *